US012517958B2

(12) United States Patent
Andrabi et al.

(10) Patent No.: US 12,517,958 B2
(45) Date of Patent: Jan. 6, 2026

(54) SYSTEM AND METHOD FOR NEXT STEP PREDICTION OF ICS FLOW USING ARTIFICIAL INTELLIGENCE/MACHINE LEARNING

(71) Applicant: ORACLE INTERNATIONAL CORPORATION, Redwood Shores, CA (US)

(72) Inventors: Syed Najeeb Andrabi, Cupertino, CA (US); Rajan Modi, Highlands Ranch, CO (US); Venkatesh Mohanram, Bangalore (IN); Muthukumar Palanisamy, Bangalore (IN); Michael Hwang, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 899 days.

(21) Appl. No.: 16/566,504

(22) Filed: Sep. 10, 2019

(65) Prior Publication Data

US 2020/0125892 A1 Apr. 23, 2020

(30) Foreign Application Priority Data

Oct. 18, 2018 (IN) .............................. 201841039490

(51) Int. Cl.
*G06F 16/908* (2019.01)
*G06F 8/34* (2018.01)
(Continued)

(52) U.S. Cl.
CPC .............. *G06F 16/908* (2019.01); *G06F 8/34* (2013.01); *G06F 18/231* (2023.01); *G06N 5/047* (2013.01);
(Continued)

(58) Field of Classification Search
CPC .. G06F 16/9035; G06F 16/908; G06F 9/3005; G06F 9/461; G06F 3/04842;
(Continued)

(56) References Cited

U.S. PATENT DOCUMENTS 7,076,762 B2   7/2006 Fisher
8,468,244 B2   6/2013 Redlich
(Continued)

FOREIGN PATENT DOCUMENTS

CN   104239058   12/2014
CN   107750360   3/2018

OTHER PUBLICATIONS

2. Zhang, Li, Frank Fowley, and Claus Pahl. "A template description framework for services as a utility for cloud brokerage.", International Conference on Cloud computing and services Science, 2014, pp. 1-10) (Year: 2014).*

(Continued)

*Primary Examiner* — Miranda M Huang
*Assistant Examiner* — Yao David Huang
(74) *Attorney, Agent, or Firm* — TUCKER ELLIS LLP

(57) ABSTRACT

In accordance with an embodiment, described herein are systems and methods for auto-completion of ICS flow using artificial intelligence/machine learning. Next actions prediction is a service that assists users in modeling the flows quickly by predicting and suggesting the next set of actions a user might be thinking of adding. The service also assists the user to follow some of the best practices while creating an integration flow.

20 Claims, 14 Drawing Sheets

(51) Int. Cl.
  *G06F 9/46* (2006.01)
  *G06F 18/231* (2023.01)
  *G06N 5/047* (2023.01)
  *G06N 20/00* (2019.01)
  *G06N 20/20* (2019.01)

(52) U.S. Cl.
  CPC ............ *G06N 20/00* (2019.01); *G06N 20/20* (2019.01); *G06F 9/461* (2013.01)

(58) Field of Classification Search
  CPC ........ G06F 8/34; G06K 9/6219; G06N 20/00; G06N 20/20; G06N 5/003; G06N 5/047
  See application file for complete search history.

(56) References Cited

U.S. PATENT DOCUMENTS

| | | | |
|---|---|---|---|
| 8,607,190 B2 | 12/2013 | Coldicott et al. | |
| 9,317,808 B2 | 4/2016 | Andrabi | |
| 9,535,902 B1 | 1/2017 | Michalak | |
| 10,169,720 B2 | 1/2019 | Chien | |
| 10,394,532 B2 | 8/2019 | Bar-Or | |
| 10,402,740 B2 | 9/2019 | Hoetzer | |
| 10,417,355 B1* | 9/2019 | Torgerson | G06F 8/34 |
| 10,419,722 B2 | 9/2019 | Guzik | |
| 10,466,863 B1* | 11/2019 | Guy | G06F 8/33 |
| 10,496,927 B2 | 12/2019 | Achin | |
| 10,592,068 B1* | 3/2020 | Sedky | G06F 9/50 |
| 10,621,677 B2 | 4/2020 | Mascaro | |
| 10,956,821 B2 | 3/2021 | Aggarwal | |
| 11,170,438 B1 | 11/2021 | Reses | |
| 11,175,910 B2 | 11/2021 | Bar-Or | |
| 2009/0254572 A1* | 10/2009 | Redlich | G06Q 10/06 |
| 2011/0018998 A1 | 1/2011 | Guzik | |
| 2011/0202887 A1* | 8/2011 | Mendez | G06F 8/34 715/856 |
| 2013/0080584 A1 | 3/2013 | Benson | |
| 2014/0359574 A1* | 12/2014 | Beckwith | G06F 8/33 717/113 |
| 2015/0350443 A1* | 12/2015 | Kumar | G06F 3/04842 379/265.13 |
| 2016/0357535 A1 | 12/2016 | Gravenites et al. | |
| 2016/0357826 A1* | 12/2016 | Raheja | G06F 16/9537 |
| 2016/0358354 A1* | 12/2016 | Alli | H04L 67/02 |
| 2017/0228661 A1 | 8/2017 | Chien | |
| 2017/0308960 A1* | 10/2017 | Mascaro | G06Q 10/10 |
| 2017/0315789 A1* | 11/2017 | Lam | G06Q 10/0633 |
| 2017/0351511 A1 | 12/2017 | Bar-Or | |
| 2018/0032505 A1 | 2/2018 | Hoetzer | |
| 2018/0046926 A1 | 2/2018 | Achin | |
| 2018/0052861 A1 | 2/2018 | Seetharaman et al. | |
| 2018/0101771 A1 | 4/2018 | Schwarm | |
| 2018/0150757 A1 | 5/2018 | Aggarwal | |
| 2018/0210709 A1* | 7/2018 | Bharthulwar | G06F 8/33 |
| 2019/0205792 A1* | 7/2019 | Huang | G06F 9/4881 |
| 2019/0273754 A1 | 9/2019 | Ting | |
| 2020/0125891 A1 | 4/2020 | Andrabi | |
| 2020/0125977 A1 | 4/2020 | Andrabi | |
| 2021/0136096 A1 | 5/2021 | Janakiraman | |
| 2021/0158221 A1 | 5/2021 | Marlin | |
| 2022/0057519 A1 | 2/2022 | Goldstein | |

OTHER PUBLICATIONS

Basak et al., "Interpretable Hierarchical Clustering by Constructing an Unsupervised Decision Tree," IEEE Transactions on Knowledge and Data Engineering, vol. 17, No. 1, Jan. 2005 (Year: 2005).*
International Search Report and the Written Opinion of the International Searching Authority mailed Jan. 10, 2020 for PCT Application No. PCT/US2019/056364, 11 pages.
International Search Report and the Written Opinion of the International Searching Authority mailed Jan. 14, 2020 for PCT Application No. PCT/US2019/056962, 13 pages.
Aslett, "SnapLogic unveils machine-learning-driven integration assistance", 451 Research, Apr. 20, 2017, retrieved from ycluz33w9skgdkhey8rajqm6-wpengine.netdna-ssl.com/wp-content/uploads/2017/08/451_Reprint_Snaplogic_20APR2017.pdf on Jan. 15, 2020, 3 pages.
Deshpande, "SAP Cloud Platform Integration—Copy Integration Flow", Sep. 17, 2018, retrieved from https:// blogs.sap.com/2018/09/17/sap-cloud-platform-integration-copy-integration-flow-artifact/ on Feb. 25, 2019, 2 pages.
Frank, "SnapLogic's AI simplifies enterprise software connections", IDG Communications, Inc., Apr. 19, 2017, retrieved from https://www.infoworld.com/article/3191124/snaplogics-ai-simplifies-enterprise-software-connections.html on Jan. 15, 2020, 3 pages.
Indexcel, "Machine Learning's Impact on Cloud Computing", Jan. 18, 2018, retrieved from http://www.idexcel.com/blog/machine-learnings-impact-on-cloud-computing/ on Feb. 25, 2019, 6 pages.
Informatica, "Cloud Data Integration", retrieved from https://www.informatica.com/in/products/cloud-integration/cloud-data-integration.html on Feb. 25, 2019, 8 pages.
"Integration Cloud Service", retrieved from http://eaiesb.com/ICS.html on Feb. 25, 2019, 2 pages.
Olavsrud, "Bringing AI to enterprise integration", Apr. 21, 2017, retrieved from https://www.cio.com/article/3191654/artificial-intelligence/bringing-ai-to-enterprise-integration.html on Feb. 25, 2019, 4 pages.
SnapLogic, "SnapLogic", retrieved from www.snaplogic.com on Jan. 15, 2020, 6 pages.
SnapLogic, "The AI Mindset: Getting Started with Self-Service Machine Learning", retrieved from https://www.snaplogic.com/resources/videos/ai-mindset-self-service-machine-learning on Jan. 15, 2020, 4 pages.
SnapLogic, "SnapLogic for B2B Integration", retrieved from https://ycluz33w9skgdkhey8rajqm6-wpengine.netdna-ssl.com/wp-content/uploads/2018/11/SnapLogic-for-B2B-Integration-Data-Sheet.pdf on Feb. 25, 2019, 2 pages.
SnapLogic, "SnapLogic for B2B Integration", retrieved from https://www.snaplogic.com/products/snaplogic-b2b-integration on Jan. 15, 2020, 6 pages.
SnapLogic, "How SnapLogic Works", retrieved from https://www.snaplogic.com/products/how-it-works on Feb. 25, 2019, 9 pages.
SnapLogic, "Iris Artificial Intelligence", retrieved from https://www.snaplogic.com/products/iris-artificial-intelligence on Jan. 15, 2020, 6 pages.
SnapLogic, "SnapLogic Innovation Day 2018", retrieved from https://www.snaplogic.com/resources/videos/greg-benson-snaplogic-innovation-day-2018, 4 pages.
SnapLogic, "SnapLogic Intelligent Integration Platform Snaps", retrieved from https://ycluz33w9skgdkhey8rajqm6-wpengine.netdna-ssl.com/wp-content/uploads/2018/06/ds_sl_snaps_LTR.pdf on Feb. 25, 2019, 2 pages.
Talend, "Cloud Integration", retrieved from https://www.talend.com/products/integration-cloud/ from Feb. 25, 2019, 11 pages.
United States Patent and Trademark Office, Office Communication dated Mar. 1, 2022 for U.S. Appl. No. 16/566,490, 16 pages.
United States Patent and Trademark Office, Office Communication dated Jan. 20, 2022 for U.S. Appl. No. 16/566,511, 20 pages.
Intellectual Property India, Examination report under sections 12 & 13 of the Patents Act, 1970 and the Patents Rules, 2003 for Indian Patent Application No. 202147020726, 7 pages.
SnapLogic, "SnapLogic for B2B Integration solution architecture", 2 pages, retrieved on Dec. 31, 2021, from: <https://www.snaplogic.com/products/snaplogic-b2b-integration>.
Benson, Ph.D., Gregory D, U.S. Appl. No. 61/538,710, filed Sep. 23, 2011 titled "Predictive Field Linking for Data Integration Pipeline", 11 pages.
United States Patent and Trademark Office, Office Communication dated Mar. 24, 2023 for U.S. Appl. No. 16/566,511, 27 pages.
Japan Patent Office, Notice of Reasons for Refusal dated Nov. 2, 2023 for Japanese Patent Application No. 2021-521187, 8 pages.
United States Patent and Trademark Office, Office Communication dated Feb. 21, 2024 for U.S. Appl. No. 16/566,511, 29 pages.
Japan Patent Office, Decision to Grant a Patent dated Apr. 19, 2024 for Japanese Patent Application No. 2021-521187, 6 pages.

(56) References Cited

OTHER PUBLICATIONS

China National Intellectual Property Administration, Notification of the First Office Action dated Feb. 23, 2024 for Chinese Patent Application No. 201980077673.8 , 5 pages.
United States Patent and Trademark Office, Office Communication dated Aug. 28, 2024 for U.S. Appl. No. 16/566,511 , 29 pages.
United States Patent and Trademark Office, Notice of Allowance and Fee(s) Due dated Jan. 23, 2025 for U.S. Appl. No. 16/566,511, 14 pages.

* cited by examiner

SYSTEM AND METHOD FOR NEXT STEP PREDICTION OF ICS FLOW USING ARTIFICIAL INTELLIGENCE/MACHINE LEARNING

CLAIM OF PRIORITY AND CROSS REFERENCE TO RELATED APPLICATIONS

This application claims priority to India Patent Application entitled "SYSTEM AND METHOD FOR AUTO-COMPLETION OF ICS FLOW USING ARTIFICIAL INTELLIGENCE/MACHINE LEARNING", Application No. 201841039490, filed on Oct. 18, 2018, which application is herein incorporated by reference.

This application is related to U.S. patent application entitled "SYSTEM AND METHOD FOR AUTO-COMPLETION OF ICS FLOW USING ARTIFICIAL INTELLIGENCE/MACHINE LEARNING", filed on Sep. 10, 2019 as application Ser. No. 16/566,490; and U.S. Patent Application entitled "SYSTEM AND METHOD FOR NEXT OBJECT PREDICTION FOR ICS FLOW USING ARTIFICIAL INTELLIGENCE/MACHINE LEARNING" filed on Sep. 10, 2019 as application Ser. No. 16/566,511, which applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related integration cloud services, and in particular, auto completion of flows in integration cloud services using artificial intelligence and/or machine learning.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web based integration designer for point and click integration between applications, a rich monitoring dashboard that provides real-time insight into the transactions.

SUMMARY

In accordance with an embodiment, described herein are systems and methods for auto-completion of ICS flow using artificial intelligence/machine learning. Next actions prediction is a service that assists users in modeling the flows quickly by predicting and suggesting the next set of actions a user might be thinking of adding. The service also assists the user to follow some of the best practices while creating an integration flow.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, Oracle Integration Cloud Service (ICS), can provide a cloud-based platform for building and deploying integrations flows that connect applications residing in the cloud or on-premises. Integration Cloud Service FIG. 1 illustrates an ICS platform for designing and executing an ICS integration flow, in according with an embodiment.

Figure 1:
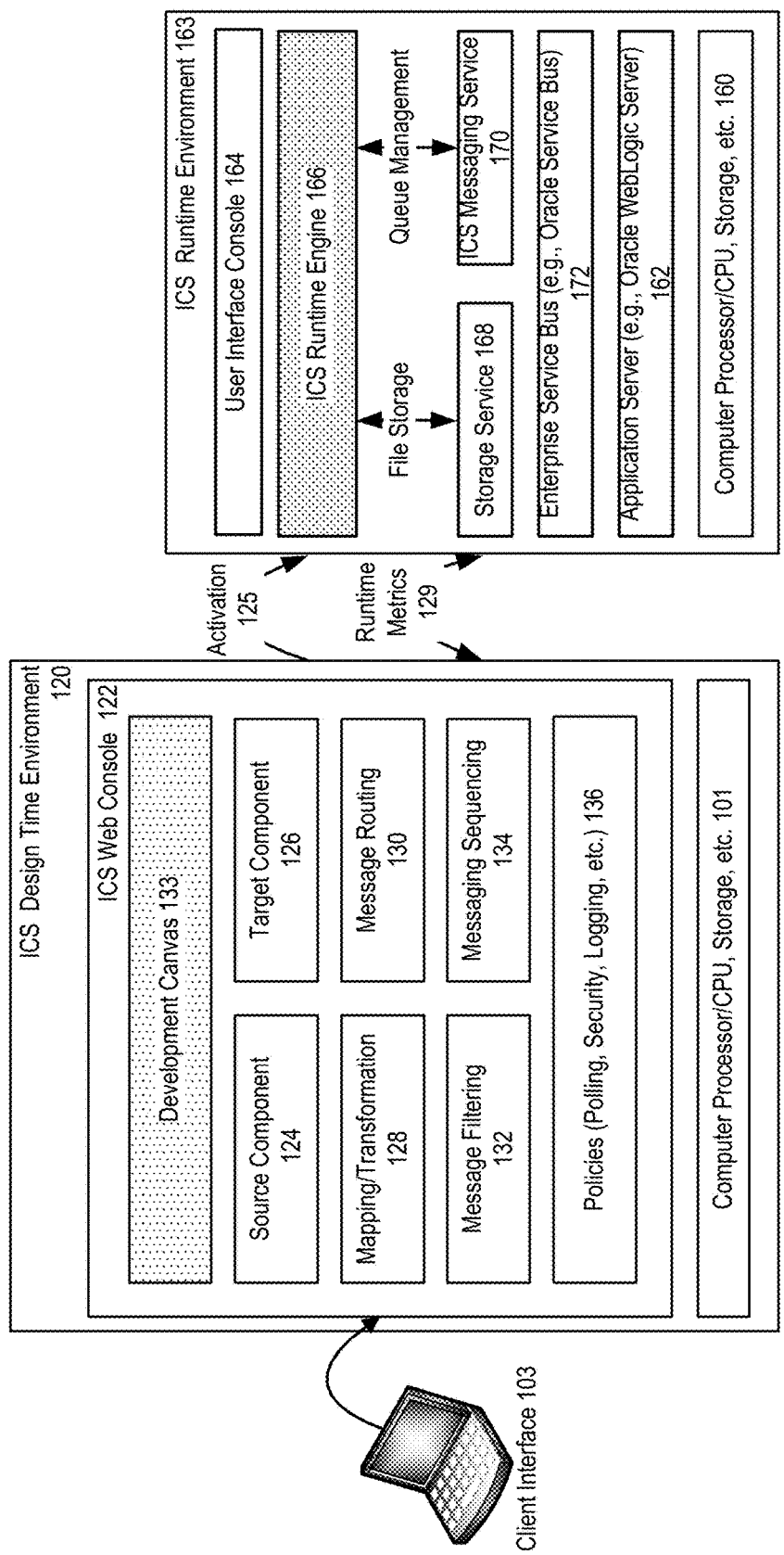
FIG. 1 illustrates an integration cloud service in accordance with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
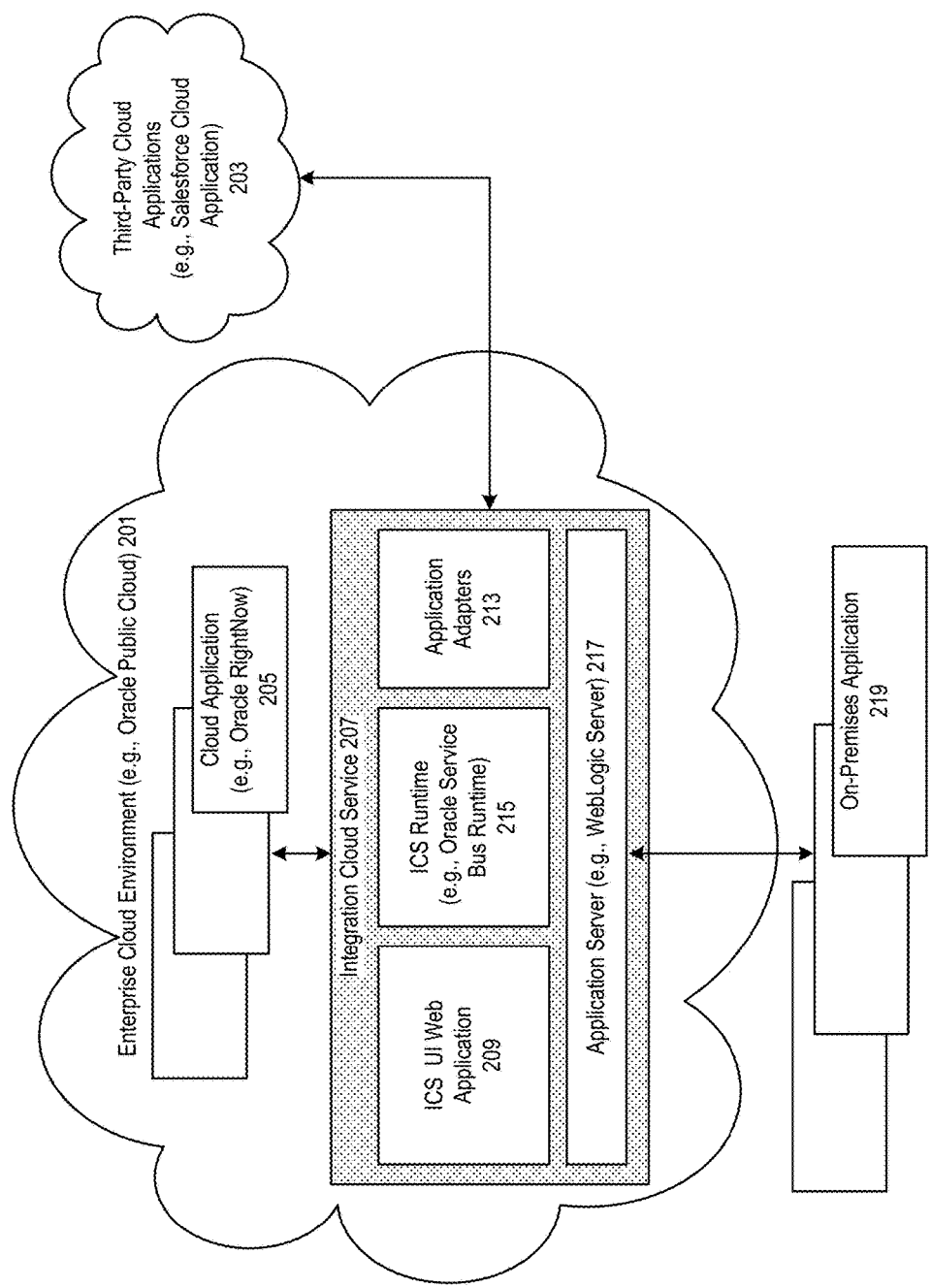
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
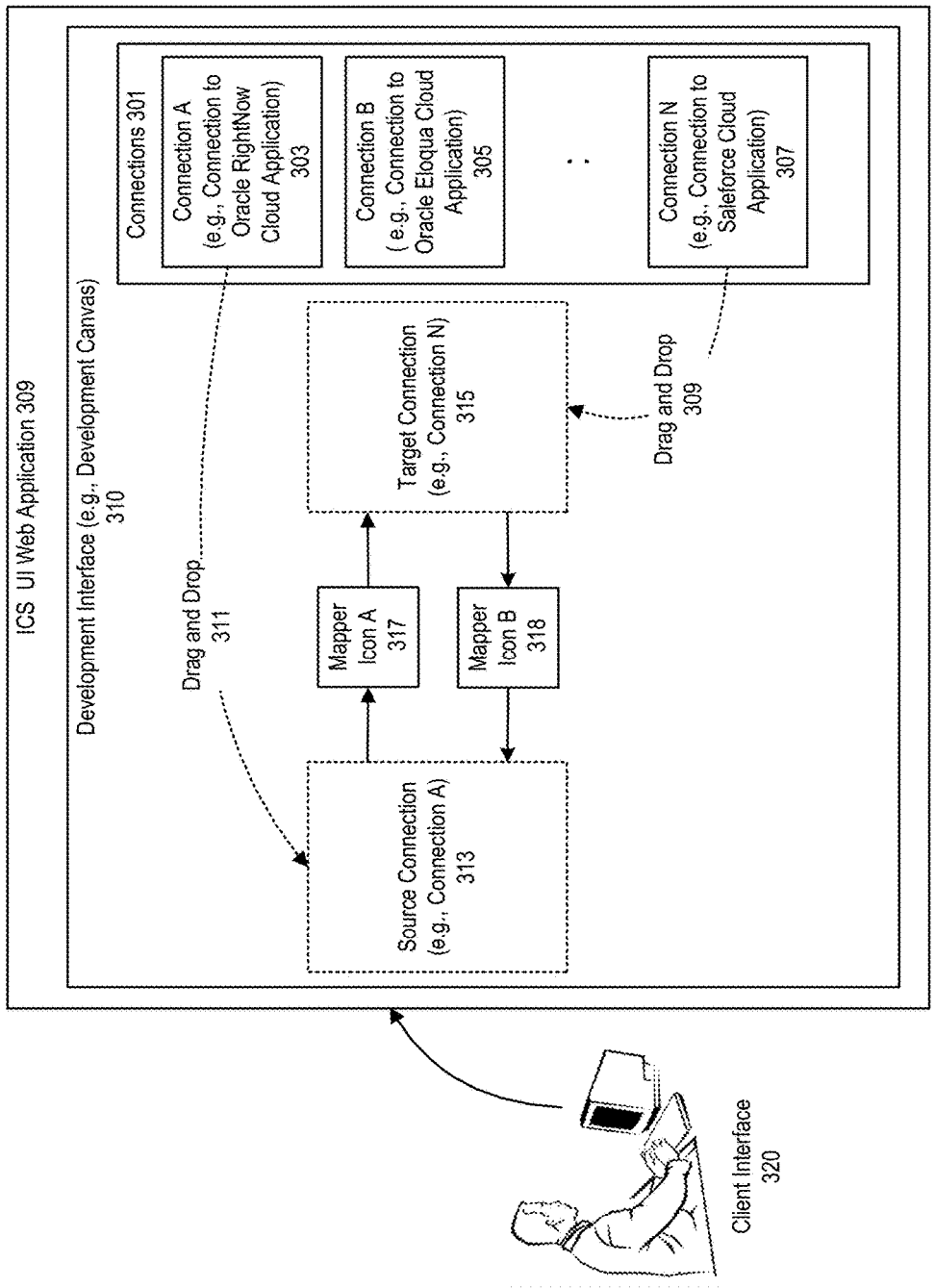
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Auto-Completion of ICS Flow Using AI/ML

In accordance with an embodiment, next actions prediction is a service that assists clients in modeling the flows quickly by predicting and suggesting the next set of actions a user might be thinking of adding. The service also assists the user to follow some of the best practices while creating an integration flow.

In accordance with an embodiment, the systems and methods provided herein comprise solutions to issues faced by users of ICS systems. For example, suppose a user is attempting to create a 'credit card application processing' flow. For an expert user, any application processing flow will have a basic pre-processing step like address and personal details verification etc. For expert user, this looks to be monotonous work as they have to do the same set of flow by themselves. For a novice user, creating such a flow would challenge them in that they would struggle to start creating the flow from the scratch, and they may miss mandatory steps while creating the integration flows. This then could lead to more time consuming problems where they must consult peers to learn the best practices in creating the flows, read/know about the business flow on the internet, etc.

In accordance with an embodiment, the systems and methods described herein can utilize AI/ML to improve integration flows by allowing customers to design solutions with least amount of effort. This can enable the use of an ICS flow designer with an ability to predict the integration flow a user is most likely going to build based on the user context only; and user and process context. For example, a mortgage officer in a bank logs in to design a mortgage approval flow; the mortgage officer can be presented with a list of ICS flows that have already implemented mortgage approval flows and are production worthy. Prediction data (including working and functional flows) can be storage at an accessible location.

In accordance with an embodiment, the systems and methods described herein can decrease the amount of time required to create a flow by providing real-time cues to a user who is currently modeling the flow. In addition, the systems and methods described herein can also allow for a decrease in error rates with regards to flows, an increase in performance of flows, and an overall optimization of the flows within ICS over existing mechanisms.

Figure 4:
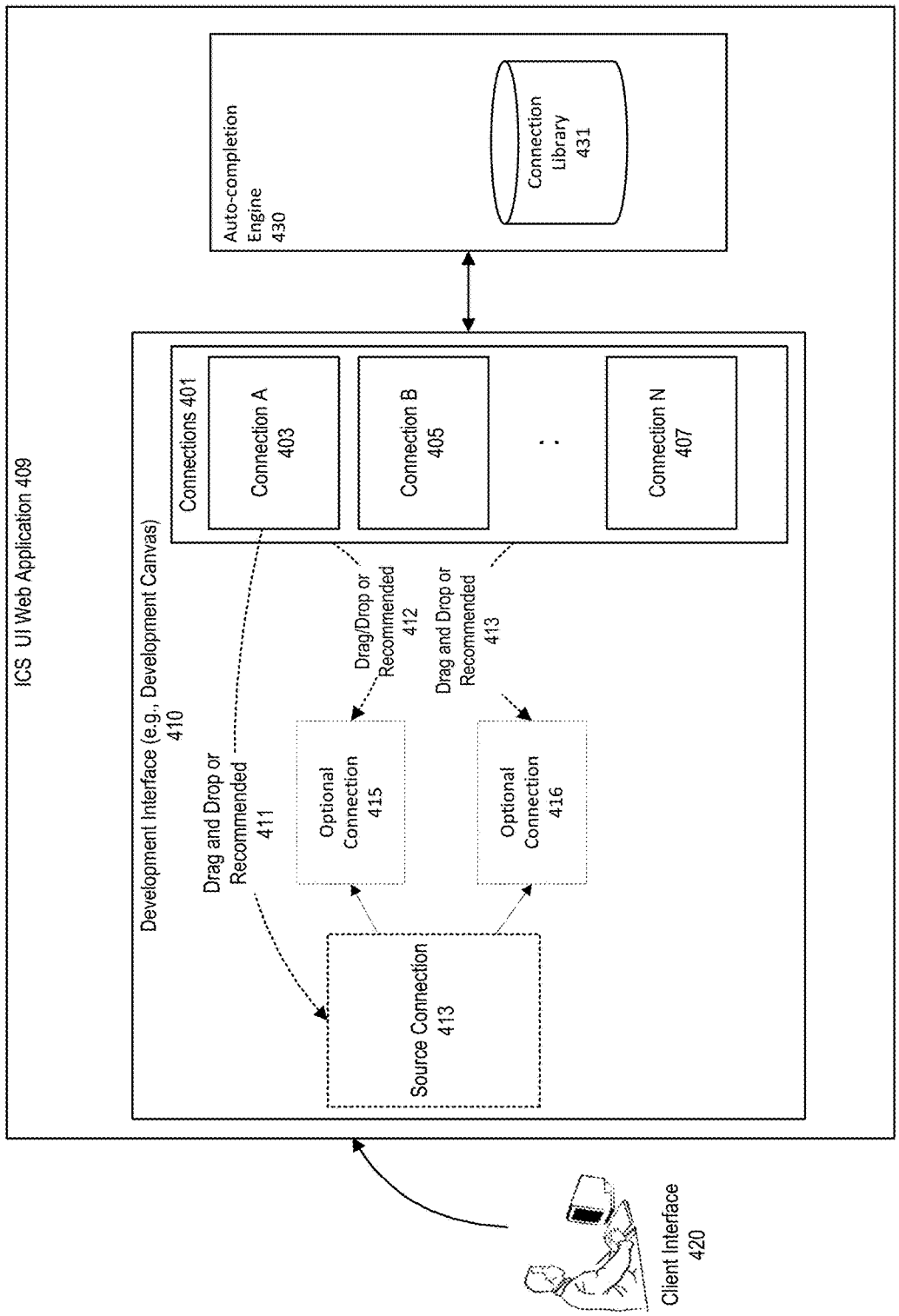
FIG. 4 illustrates a system for supporting auto-completion of ICS flows using AI/ML, in accordance with an embodiment.

FIG. 4 illustrates a system for supporting auto-completion of ICS flows using AI/ML, in accordance with an embodiment.

In accordance with an embodiment, a development interface (e.g., a development canvas) 410 in the web UI application can be used by a user to create an ICS integration flow, using a plurality of connections 401, for example, connection A 403, connection B 405 and connection N 407.

As shown in FIG. 4, a particular connection (for example, connection A) can be dragged and dropped 411 to the development interface as a source connection 413. Alternatively, depending upon a context from the client interface 420, the source connection 413 can be recommended 411 and populated based upon an interaction with the auto-completion engine 430, which is associated with/in communication with a connection library 431.

In accordance with an embodiment, depending upon the context received from the client interface, the development interface can either allow a user to drag and drop 412 413 different connections from a library of existing connections, or the development interface can present a populated grid of optional connections 415 416 that can be selected by via the user interface. In accordance with an embodiment, the context can be associated with the source connection, which can include information required to connect to a source application, and can be used by the ICS to receive requests from the source application.

In accordance with an embodiment, the source and target connections can be further configured to include additional information. For example, the additional information can include types of operations to be performed on data associated with a request, and objects and fields against those operations.

In accordance with an embodiment, the recommended connections displayed via the client interface can be updated in real time, based upon selections received from the client interface. In addition, the recommended connections can be provided based on the context of a flow being modeled. As the flow grows, so does the context associated with the flow. Based upon the context, the real time suggestions can be altered to be more fine-grained and accurate.

In accordance with an embodiment, upon selection of one of the real time recommended connections, the systems and methods described herein can automatically configured a selection portion of the flow. Such automatic configuration can be overridden if desired. In addition, based upon subsequent selections of recommended connections, further recommended sections for the ICS flow can be altered, updated, reconfigured, deleted, or added, . . . etc.

In accordance with an embodiment, the process of creating an integration flow can be simplified in that the described auto-completion can gather together basic steps, which then frees users to concentrate on other parts of a flow that are more sensitive. In addition, as context grows, the described systems and methods can automatically add to flows desired or necessary steps based upon the context of the flow.

In accordance with an embodiment, ICS designer can present recommended ICS flows based on user context. User context takes into account the organization, subsidiary if applicable, department, sub-departments if applicable and user information to generate the context; most important part of the context is the user's job description. The designer can present ICS flows including all dependent files and connectors as a single virtual project that can be previewed. If the recommended ICS flow meets user requirement; they can select the ICS flow; a virtual project is created that user can preview including testing it. The project can then be saved into a physical entity if it meets the requirements (e.g., if the flow is certified and functional).

In embodiments described herein, the flow files can be referred to as JSONs or JSON files. One of skill in the art would readily understand that the systems and methods described herein can utilize different or alternative file formats and achieve the same or similar results.

Similarity Scores for Pattern/Flow Prediction

In accordance with an embodiment, the systems and methods herein can utilize a pattern recognition model mechanism for JSON models in order to predict application flows, such as ICS flows. In this model, a similarity score can generated to indicate how closely the input/source JSON matches stored JSON patterns.

In accordance with an embodiment, a method/model can recognize structurally and semantically similar flow file patterns based on an input/source flow files. Structural and semantic similarity can determined by comparing two or more flow files (e.g., two or more JSONs), to determine how similar each field of the file is. For string fields within the flow files, natural language processing can be used to determine how similar a word or sentence is. For numeric and date fields, the systems and methods can determine how much they deviate from each other. A similarity score can be generated for each field.

In accordance with an embodiment, a flow file, such as a JSON file, can be composed of objects, arrays and primitive fields of string, numeric and boolean type. A JSON pattern recognition mechanism is based on generating a similarity score for each field that in turn is consolidated into a composite similarity score for the object and array and finally into a similarity score for the root JSON object or an array.

In accordance with an embodiment, each source JSON primitive field is compared with the target JSON field using both the key and the value. The key can be compared using natural language processing (NLP) and while the value is compared based on its type. That is, for example, string field NLP is used while for numeric field distance is calculated. Field comparison can result in a generation of a similarity score. For example, consider a target JSON for a purchase order as shown below:

```
{
    "name" : "John Smith",
    "sku" : "20223",
    "price" : 23.95,
    "shipTo" : {
        "name" : "Jane Smith",
        "address" : "123 Maple Street",
        "city" : "Pretendville",
        "state" : "NY",
        "zip" : "12345"
    },
    "billTo" : {
        "name" : "John Smith",
        "address" : "123 Maple Street",
```

```
        "city" : "Pretendville",
        "state" : "NY",
        "zip" : "12345"
    }
}
```

In accordance with an embodiment, the systems and methods described herein can take a first string from the JSON purchase order and perform a comparison against an input JSON pattern in order to determine a similarity score. For example, an input JSON pattern can include the snippet:

```
{
    "name" : "Jonn Smith"
}
```

In accordance with an embodiment, then, the method/model can recognize structurally and semantically similar flow file patterns based on a comparison of the two JSON files. In the above situation, the method/model can produce a perfect similarity score (e.g., a similarity score of "1.0") as the "name" field from the target file matches perfectly with the "name" field of the input/source file. Similarly, if the input/source file contained a "title" field instead of a "name" field, but the value of "John Smith" was the same, then the method/model could result in a high similarity score, but not a perfect store (e.g., a score of "0.9") because the field "title" is a synonym of "name".

In accordance with an embodiment, a similarity score for a field (e.g., a JSON field) can be generated using the following:

$$\text{Field Similarity Score} = \frac{(\text{Key Similarity Score} + \text{Value Similarity Score})}{2}$$

In accordance with an embodiment, a similarity score for a numeric field can be found by finding the percentage distance from a target value. For example, in looking at the above source JSON file, if an input/source JSON snippet comprised a "price: 23.95", then a similarity score would be a perfect 1.0, because not only is the natural language match a perfect match, but the value is also a perfect match. However, if a snippet of an input JSON filed comprised a "price: 22.95", the method/model would produce a similarity score of "0.9791". This would be found using the following formulas:

$$keyFormula = NLP \text{ Match Similarity Score}$$

$$valueFormula = \frac{((TargetValue - \text{abs}(TargetValue - SourceValue)))}{TargetValue}$$

$$fieldFormula = \frac{(keyFormula + valueFormula)}{2}$$

In accordance with an embodiment, if a input/source snippet comprises "price: 22.95", then the above "keyFormula" results in a score of 1.0 as the natural language processing is a complete match. However, the value formula would result in a score of 0.9582, meaning the similarity score for the entire field would be (1+0.9582)/2, resulting in a similarity score of 0.9791.

In accordance with an embodiment, the model/method described herein can support field object type pattern recognition (e.g., JSON field object type pattern recognition). JSON Object type pattern recognition can based on generating an aggregate average similarity score from similarity scores of individual fields. For example, an input flow (e.g., JSON flow) pattern can include the snippet:

```
{
    "name" : "Jonn Smith"
    "price" : 23.95
}
```

In accordance with an embodiment, the generated similarity score for the above example would be a perfect 1.0, as both the field similarity score for the "name" field, as well as the field formula score are both perfect 1.0.

In accordance with an embodiment, the similarity score can be reduced, for example, if the snippet of the input flow (e.g., JSON flow) is not an exact match for natural language process, but is, for example, a synonym. As an example, suppose the snippet from the input flow comprises:

```
{
    "title" : "Jonn Smith"
    "price" : 23.95
}
```

In accordance with an embodiment, then the similarity score will be reduced from 1.0 as only one of the two segments of the input flow is an exact match in terms of both natural language processing (i.e., the "key similarity score" fields), as well as in value (namely the "price" field and value). The other value comprises "title" instead of "name". However, because "title" is a synonym of the target flow, the similarity score will not be drastically reduced. Taking the above example, the total similarity score for this snippet can be 0.975. This can be derived from the following:

$$\text{Similarity Score} = \frac{(\text{Key Similarity Score} + \text{Value Similarity Score})}{2}$$

In accordance with an embodiment, if "title" is given a key similarity score of 0.9, then the total similarity score of the above snippet can be calculated as:

$$\text{Similarity Score} = \frac{\left(\frac{(0.9+1)}{2} + \frac{(1+1)}{2}\right)}{2} = 0.975$$

In accordance with an embodiment, the similarity score can be reduced further, for example, if the snippet of the input flow (e.g., JSON flow) is not an exact match for natural language process, but is, for example, a synonym. As an example, suppose the snippet from the input flow comprises:

```
{
    "title" : "Jonn Smith"
    "cost" : 23.95
}
```

In accordance with an embodiment, then the similarity score will be reduced from 1.0 as both of the segments of the input flow is are not exact matches in terms of natural language processing (i.e., the "key similarity score" fields). Both key fields are synonyms of the target flow. Because "title" is a synonym of the target flow, and "cost" is a synonym of the target flow, the similarity score will not be drastically reduced. Taking the above example, the total similarity score for this snippet can be 0.95.

In accordance with an embodiment, if "title" and "cost" are given a key similarity scores of 0.9, then the total similarity score of the above snippet can be calculated as:

$$\text{Similarity Score} = \frac{\left(\frac{(0.9+0.9)}{2} + \frac{(1+1)}{2}\right)}{2} = 0.95$$

Field Array Type Pattern Recognition for Similarity Score

In accordance with an embodiment, the method/model described herein can utilize field array type pattern recognition. Such array type pattern recognition (e.g., JSON array type pattern recognition) can be based on generating an aggregate average similarity score from similarity scores of individual fields taking into account offset within the array. As an example, supposed the below comprises an input source array pattern:

```
[
    "alpha",
    "bravo",
    "charlie"
]
```

In addition, supposed that the target array pattern comprises an exact match, namely:

```
[
    "alpha",
    "bravo",
    "charlie"
]
```

In accordance with an embodiment, then the similarity score for the array would be a perfect 1.0.

In accordance with an embodiment, in order to determine a field similarity score of a field in an array, the following formula can be used:

$$fieldSimilarityScore = \frac{\left(SimilarityScore + \left(ArrayLength - \frac{SourceArrayIndex - \frac{TargetArrayIndex}{ArrayLength}}{ArrayLength}\right)\right)}{2}$$

where ArrayLength =
    if (SourceArrayLength > TargetArrayLength) {
        ArrayLength = SourceArrayLength
    }
    else {
        ArrayLength = TargetArrayLength
    }

In accordance with an embodiment, in order to determine a similarity score for an array of fields, the following formula can be used:

$$SimilarityScore_{Array} = \left( \frac{field1SimilarityScore + field2SimilarityScore + \ldots fieldNSimilarityScore}{\text{number of fields}} \right)$$

In accordance with an embodiment, for example, if the same input source array pattern as above was matched with a target array pattern of that shown immediately below, then the array similarity score would be 0.8:

[
"x-ray",
"yankee",
"alpha",
"bravo",
"charlie"
]

Calculating the similarity score for the array:

$$SimilarityScore_{Array} = \frac{1 + \frac{(5-2)}{5} \quad 1 + \frac{(5-2)}{5} \quad 1 + \frac{(5-2)}{5}}{\frac{2}{3} + \frac{2}{3} + \frac{2}{3}} = 0.8$$

Figure 5:
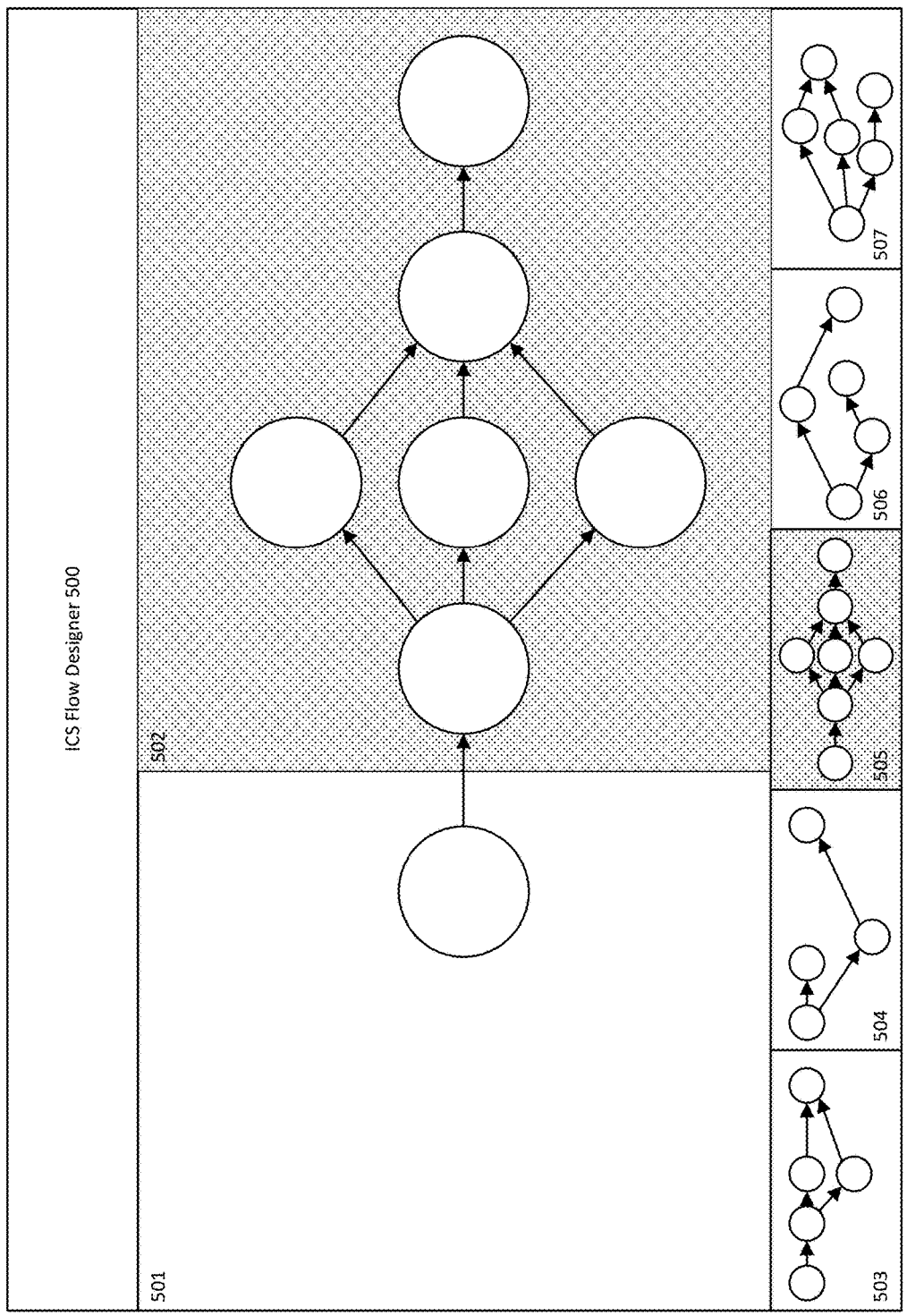
FIG. 5 illustrates an exemplary flow chart decision tree, in accordance with an embodiment.

FIG. 5 illustrates an exemplary flow chart decision tree, in accordance with an embodiment.

In accordance with an embodiment, a user may select a first portion of an integrated flow, which is shown in the unshaded portion 501 of the flow designer 500. From this beginning of an integrated flow, depending upon the context of the user, the systems and methods can present a number of options 503-507 to the user to be variously selected. As shown in the figure, option 505 is currently being displayed in window 502 (current selection window). Additional flow recommendations can be provided as a card layout which can be selected. On selection of a particular flow, the ICS designer displays the entire flow. Button navigation can also be provided.

In accordance with an embodiment, upon the recommended process for the flow may not be selected (e.g., where the recommendation is not a correct recommendation). In this scenario, other process recommendations can be consistently presented as predictions within a "prediction plane" depicted as in the flow in the shaded regions in the figure. This then provides an option of selecting individual tasks or the entire flow. The systems and methods can also present a card layout that can be flicked for all the possible recommendations to complete the flow. This allows for navigation to see how each predicted ICS flow looks like and how it behaves. The flows can be tested in real time as each option is selected. The testing can provide functional and performance profiles before a final selection of the flow.

In accordance with an embodiment, the flows in 502 can be displayed in a number of different manners. The flows can be displayed as shown in the figure as a completed flow (that has been tested and qualified). Alternatively, the optional flows can be presented in an overlay manner (e.g., dashed outlines) where only the next set number of flow steps are displayed to a user until an instruction is received to select one of the presented options. Alternatively, the optional flows can be displayed as a completed flow, but in overlay manner, allowing the user to select different portions of the completed flow to see differing branching options that can be selected.

Process Model Prediction

In accordance with an embodiment, the systems and methods herein provide a hierarchical clustering model of invariant pattern recognition of process models. In this model, knowledge of how a process is designed is learned and encapsulated as a hierarchy of clusters of process models based on user and process context with the most accurate cluster being the leaf of the cluster tree. The knowledge is encoded in a tree structure that can be queried based on user and process context.

In accordance with an embodiment, reorganizing process models is a complex and time consuming job. Systems and methods can identify patterns by matching small snippets of a larger existing pattern. The systems and methods can predict process model by hierarchical clustering of process model based on user and process context. Clustering on process context can be based on recognizing XML/JSON patterns.

Figure 6:
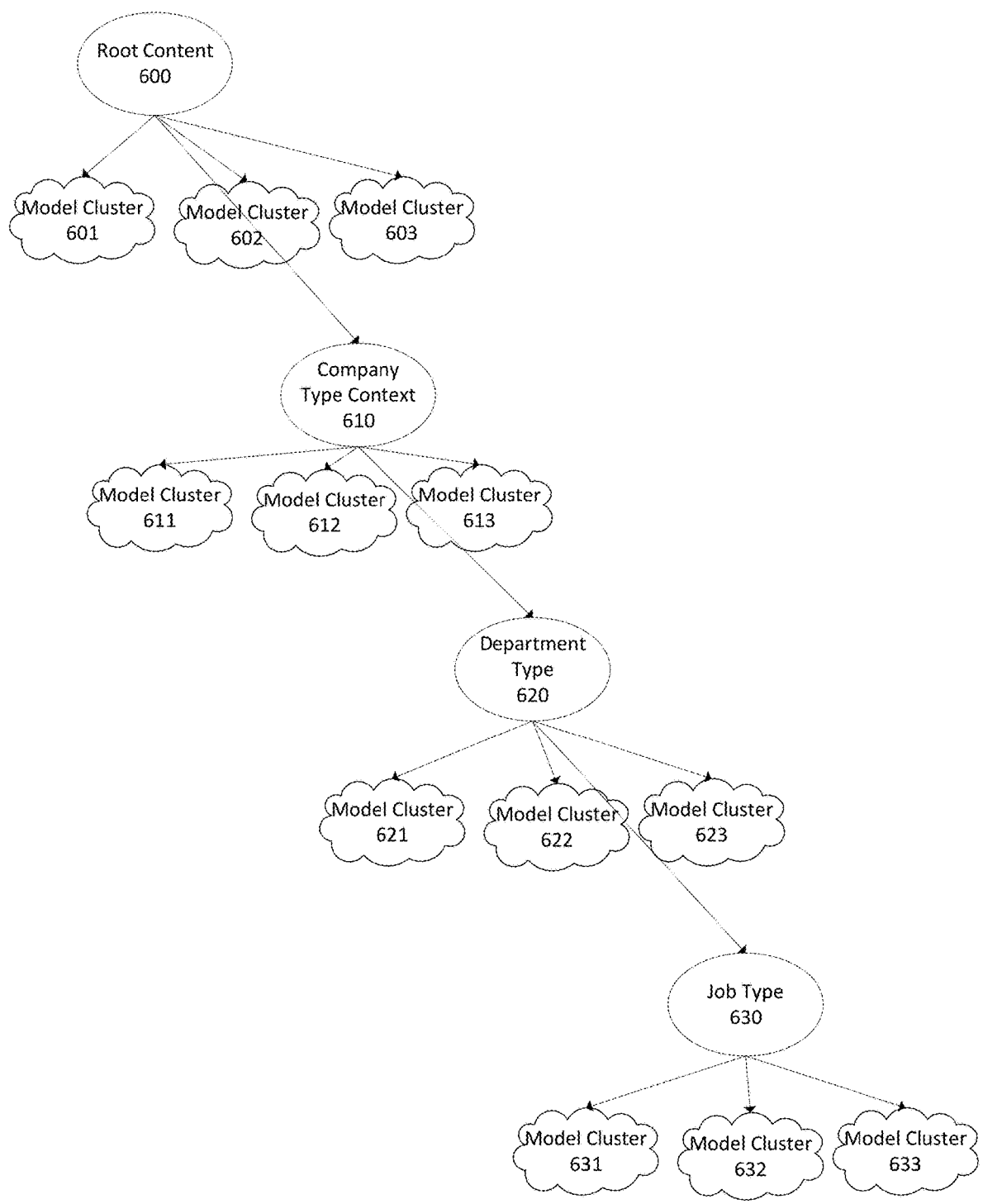
FIG. 6 shows a hierarchical tree structure for use in supporting systems auto-completion of ICS flows using AI/ML, in accordance with an embodiment.

FIG. 6 shows a hierarchical tree structure for use in supporting systems auto-completion of ICS flows using AI/ML, in accordance with an embodiment. More particularly, FIG. 6 shows a self-designing enterprise system, in accordance with an embodiment.

In accordance with an embodiment, learning and pattern recognition algorithms exploit this hierarchical structure. These nodes model clustering regions based on context. A node can have several children and a parent. Input models go to the nodes at all levels based on context. At each level nodes have children that are clusters of similar models based on the parent context hierarchy. Hierarchy of nodes is based on context; top level is the root context, followed by company type context that can have sub-company, followed by department types and sub-departments, followed by user context; finally the job type context. Each of these tree nodes are indexed.

As an example, a structure can comprise a root context 600 which can be associated with a number of model clusters 601-603. Below the root context can be a company type context 610, which can be associated with a number of model clusters 611-613. Below the company type context can be a department type 620, which can be associated with a number of model clusters 621-623. Below the department type can be a job type 630, which can be associated with a number of models clusters 631-633.

In accordance with an embodiment, each model cluster can be pre-populated with a plurality of evaluated and certified integrated flows. Each of these integrated flows can be stored at, for example, a storage associated with an auto-completion engine. For example, supposed model cluster 631 deals with a point of sale integrated flow. A user, who is classed into a job type 630, can then be, on login and indication of a point of sale flow, presented with the plurality of integrated flows from model cluster 631.

In accordance with an embodiment, model cluster 621 can also be associated with a plurality of evaluated and certified integrated flows. If the user declines to select any of the plurality of integrated flows from model cluster 631, then the tree can move back up to the department type 620 (also associated with the user from the context), and present to the user the plurality of flows from model cluster 621. This recursive situation can go on so long as the user continues to decline to select any of the presented flows.

In accordance with an embodiment, each of the plurality of flows can be presented to the user as a complete flow, or can be presented to the user in a step-wise manner, where each subsequent selection causes the systems and methods to present a number of options selected from a correct model cluster 631.

In accordance with an embodiment, a self-learning algorithm can operate on the hierarchical data structure shown in FIG. 6. The hierarchical data structure is initialized by already collected data that consists of models that are already in production hence ensuring the quality of the data. The algorithm can automatically rebuild the model clusters in the hierarchy when a change/addition is introduced. Then, a new model is put into production for a particular context. The self-learning algorithm first puts the model into one of the root model clusters based on it syntactic and semantic similarity. Next based on the company, department, job and the user context it updates the remaining hierarchical model clusters.

In accordance with an embodiment, a pattern recognition algorithm can be based on recognizing the sent input pattern by looking at the context information and generating a key that can be used to identify similar models in the present (sent) context. Model patterns are recognized that are ranked from more accurate to less accurate based on how closely the company, department, job and user context matches the pre-calculated model clusters; recommendations are further ranked on combinations of company, department, job and user context from most accurate to the least accurate i.e. company, department, job and user context, followed by company, department and job context, followed by company and department and company context.

In accordance with an embodiment, systems and methods generally will not present a user with less accurate recommendations. However, if a user does not choose a more accurate model, then the algorithm can determine that the desired model is more generic. For example; for a physicist that only buys physics books that deal with quantum mechanics; a system would most likely recommended books on quantum mechanics. However, assume that the physicist is in mood to read about philosophy so he/she rejects the recommendation of books on quantum mechanics. Then the recommendation system knows from the user context that physicist has interest in philosophy, so the next recommendation could be philosophy books based on user's interest in the subject. So the system first makes recommendation purely based on the pattern itself; user has never bought a book that is not on quantum mechanics; so if he/she rejects this recommendation next recommendation we present to him/her is based on subject he/she likes in this case philosophy. Next time the same user log-ins in we will give recommendations that would include some philosophy books.

In accordance with an embodiment, the system and methods can provide recommendations based on the user context plus the model pattern that takes into account both the structure and semantics of the model. Consider a model, shown in FIG. 7, being designed. A user can create a first activity as receive activity; recommendations that are produced will be based on the user context 701 plus the structure and semantics of the process being designed. The systems and methods can match to all the clusters 705 that have similar context and models that start with receive activity plus have semantic similarity with the name, documentation etc. of the process and the receive activity. As shown in the Figure, only three clusters 702-704 are shown, but more clusters can be contained within the system and presented via a user interface.

Figure 7:
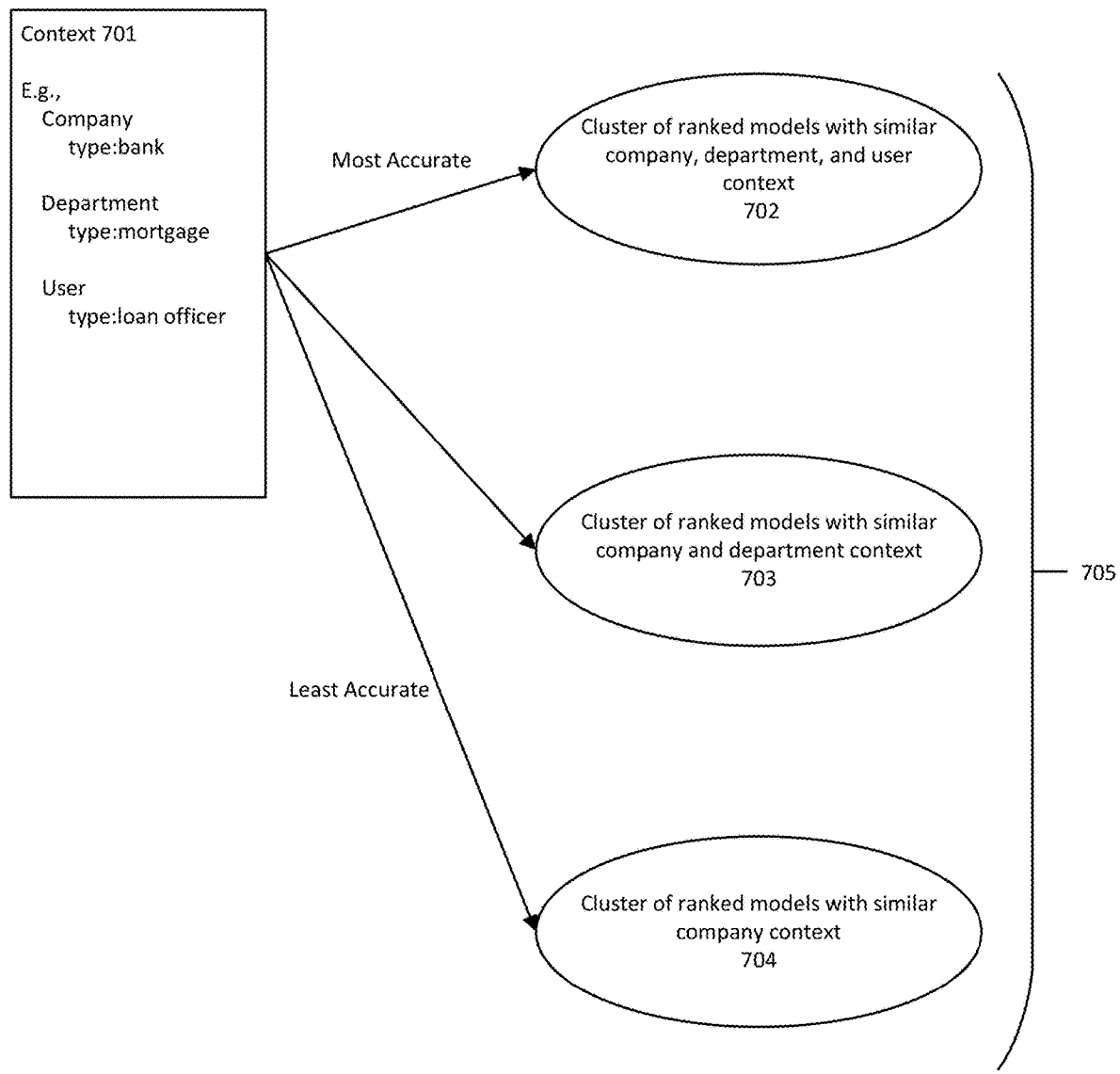
FIG. 7 shows a mapping of context to integrated flows, in accordance with an embodiment.
Figure 8:
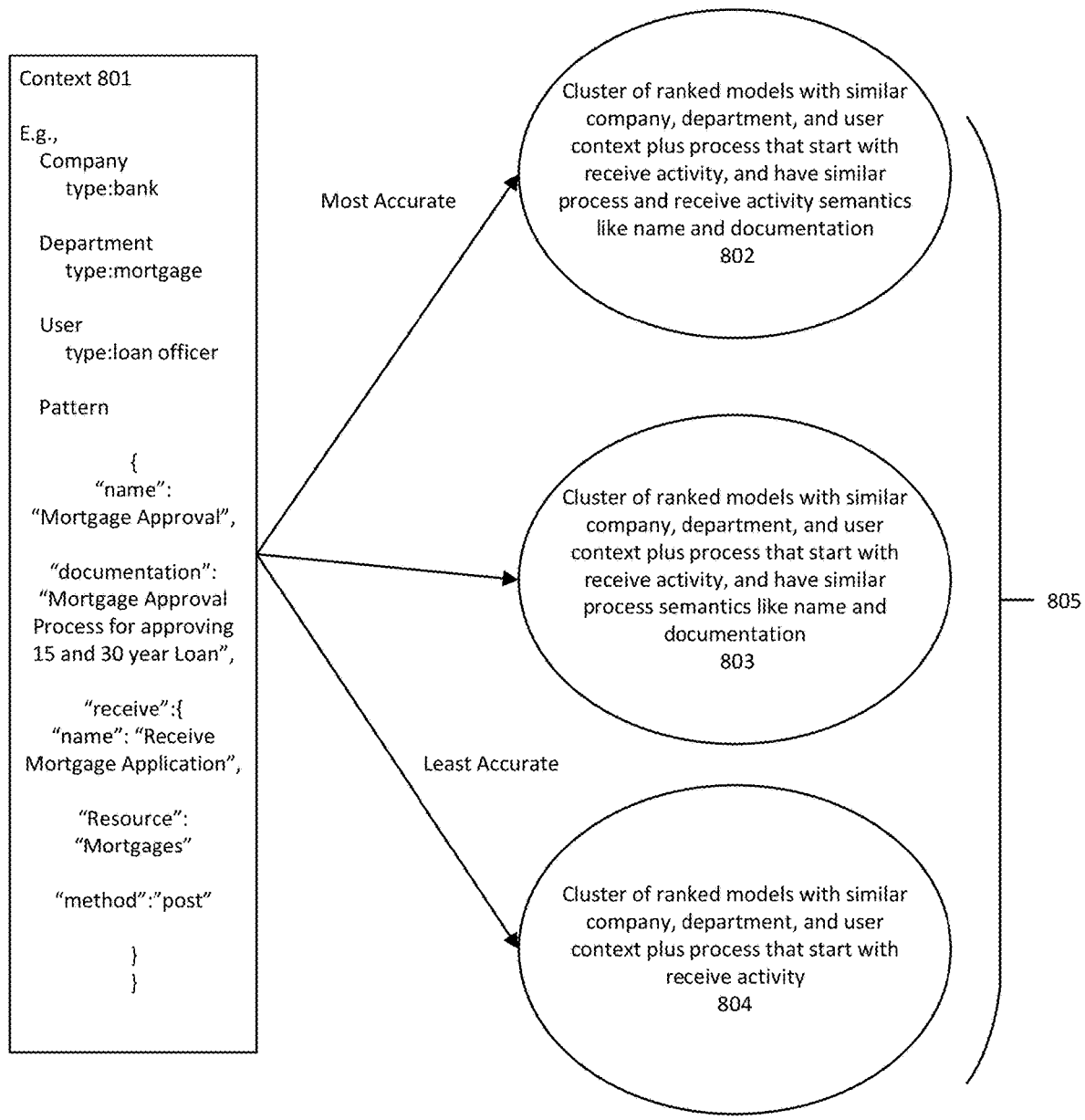
FIG. 8 shows a mapping of context to integrated flows, in accordance with an embodiment.

In accordance with an embodiment, the model of FIG. 7 can be extended, as shown in FIG. 8. By extending the model of FIG. 7; recommendations for model that has a receive and invoke task will be based on clusters 805 that have similar context 801 plus process that has a receive and invoke activity (structure) plus has similar semantics that it receives similar message for similar resource and invokes similar resource method with similar input, output and fault patterns. As shown in the Figure, only three clusters 802-804 are shown, but more clusters can be contained within the system and presented via a user interface.

Figure 9:
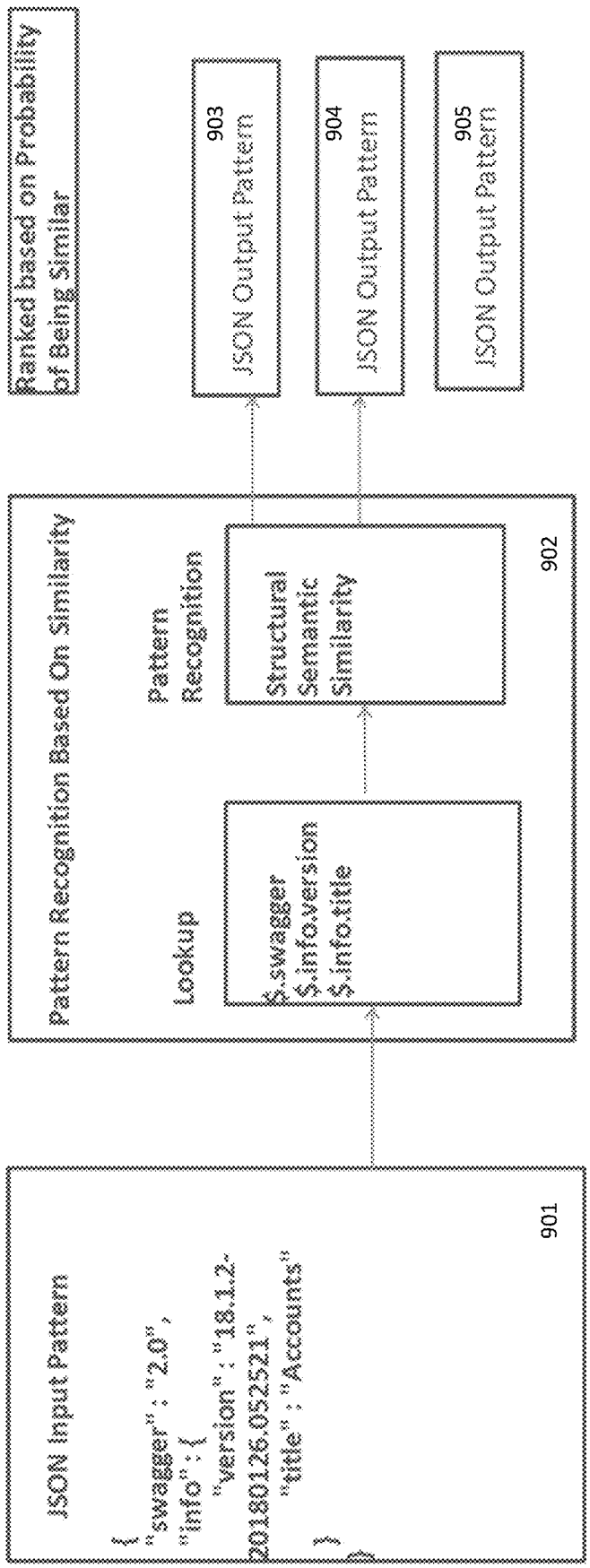
FIG. 9 shows an exemplary ranking simulator, in accordance with an embodiment.

FIG. 9 shows an exemplary ranking simulator, in accordance with an embodiment.

In accordance with an embodiment, a JSON input pattern 901 can be received. A pattern recognition based on similarity 902 can be run over the JSON input pattern, using inputs (e.g., "swagger", "info.version", and "info.title") from the JSON input pattern to rank a number of output JSON patterns 903-905 that have been matched with the JSON Input Pattern.

Figure 10:
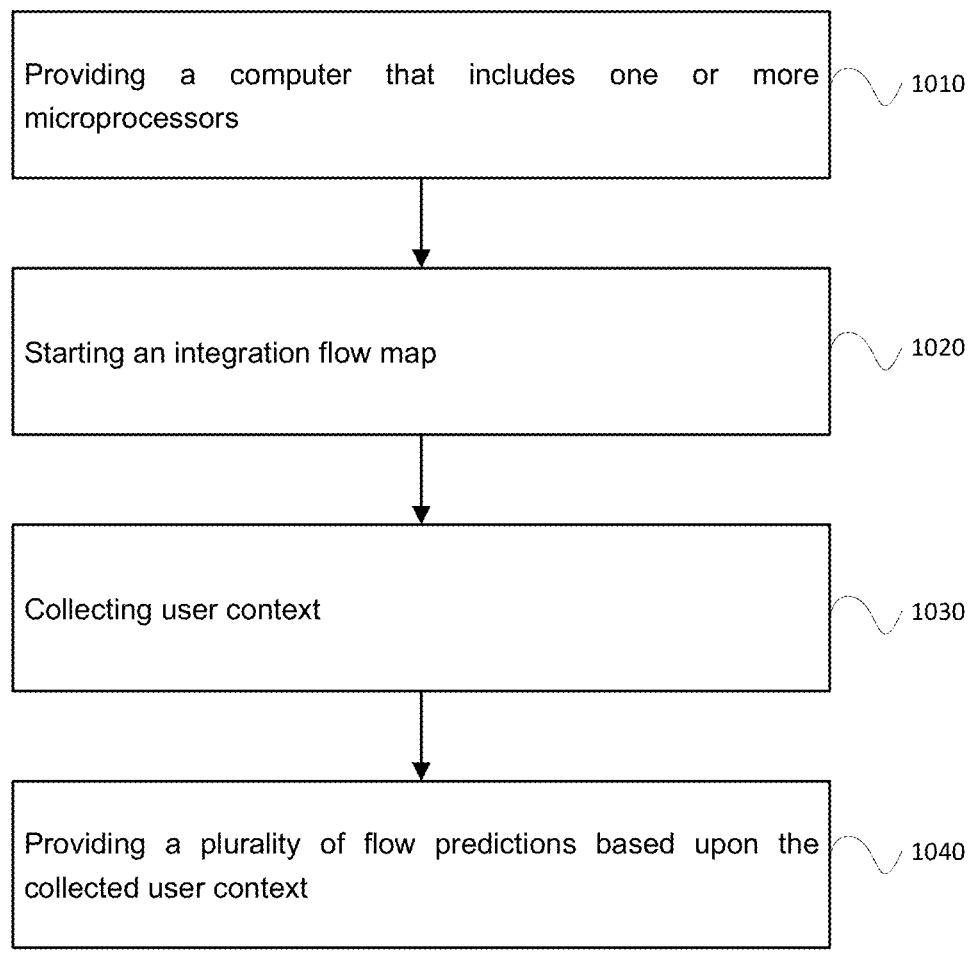
FIG. 10 shows a flowchart of a method for supporting auto-completion of ICS (integration cloud services) flow using artificial intelligence/machine learning.

FIG. 10 shows a flowchart of a method for supporting auto-completion of ICS (integration cloud services) flow using artificial intelligence/machine learning.

At step 1010, the method can provide a computer that includes one or more microprocessors.

At step 1020, the method can start an integration flow map.

At step 1030, the method can collect user context.

At step 1040, the method can provide a plurality of flow predictions based upon the collected user context.

Next Activity Prediction Based on Pattern Recognition

In accordance with an embodiment, the systems and methods described herein can provide for next activity prediction based on pattern recognition within flows, such as ICS flows, in a file format, such as a JSON file. This can be described as next activity prediction based on pattern recognition (e.g., within a JSON pattern). A next activity prediction can be made within multiple contexts, based on exact or partial context. A next task can be predicted based on all previous tasks, or a prediction can be made based on generic context that takes into account frequency of task available within a scope.

In accordance with an embodiment, after pattern recognition is performed (e.g., ICS JSON pattern recognition), and patterns are recognized, a next step prediction engine can calculate a likely (e.g., "most" likely) next step sequence based on exact or partial match (i.e., all preceding tasks match completely or partially). The system and method can also calculate next task sequence based on the enclosing scope (i.e., what is the most probable next task for a particular scope without reliance on preceding tasks).

In accordance with an embodiment, flow pattern recognition (e.g., ICS flow JSON pattern recognition) can result in a subset of models that most closely match the designed flow. Based on this subset, a next sequence of activities can predicted as perfect/partial match and as scoped prediction.

Perfect/Partial Matching

In accordance with an embodiment, when the methods and systems described herein perform perfect or partial matching in order to predict next activity, the systems and methods can perform a ranking of potential next sequence of tasks based on frequency of occurrence using pattern recognition of existing flow. For example, in the below flow which comprises a "Sales Account Creation" flow, suppose a user is in midst of designing this flow and has reached an assign step mapping account business object to a sales cloud account business object. Based on this input, a pattern recognition system recognizes at most 25 existing flows that closely match this input pattern (i.e., the flow being designed).

```
{
   "name"   : "Sales Account Creation",
   "sequence" : [
      {
      "name" : "receive",
      "type" : "receive",
      "application" : "sales",
      "operation" : "createAccount",
      "businessObject"   : "Account"
      },
      {
      "name" : "assign",
      "type" : "assign",
      "mapping" : "Copy sales Account to cloud sales Account"
      }=
   ]
}
```

In accordance with an embodiment, the systems and methods herein can comprise or have access to a number of target models that can be used in the next activity prediction. For the sake of simplicity, supposed there are the following three target models for use in the next activity prediction method/model.

Model 1:

```
{
"name"   : "Sales Account Creation - Company A, Department A",
"sequence" : [
   {
   "name" : "receive",
   "type" : "receive",
   "application" : "sales",
   "operation" : "createAccount",
   "businessObject"   : "Account"
   },
   {
   "name" : "assign",
   "type" : "assign",
   "mapping" : "Copy sales Account to cloud sales Account"
   },
   {
   "name" : "invoke",
   "type" : "invoke ",
   "application" : "cloud sales Cloud",
   "operation" : "createAccount",
   "businessObject"   : "Account"
   }
]
}
```

Model 2:

```
{
"name"   : "Sales Account Creation - Company B, Department B",
"sequence" : [
   {
   "name" : "receive",
   "type" : "receive",
   "application" : "sales",
   "operation" : "createAccount",
   "businessObject"   : "Account"
   },
   {
   "name" : "assign",
   "type" : "assign",
   "mapping" : "Copy sales Account to cloud sales Account"
   },
```

-continued

Model 2:

```
   {
   "name" : "invoke",
   "type" : "invoke ",
   "application" : "cloud sales Cloud",
   "operation" : "createAccount",
   "businessObject"   : "Account"
   }
]
}
```

Model 3:

```
{
"name"   : "Sales Account Creation - Company C, Department C",
"sequence" : [
   {
   "name" : "receive",
   "type" : "receive",
   "application" : "sales",
   "operation" : "createAccount",
   "businessObject" : "Account"
   },
   {
   "name" : "assign",
   "type" : "assign",
   "mapping" : "Copy sales Account to cloud sales Account"
   },
   {
   "name" : "if",
   "type" : "if",
   "condition" : "$cloudsalesCloud",
   "activity" : {
      "name" : "invoke",
      "type" : "invoke",
      "application" : "cloud sales Cloud",
      "operation" : "createAccount",
      "businessObject" : "Account"
   }
   else : {
      "activity" : {
      "name" : "invoke",
      "type" : "invoke",
      "application" : "S sales Cloud",
      "operation" : "createAccount",
      "businessObject" : "Account"
      }
   }
   }
]
}
```

In accordance with an embodiment, a pattern recognition can match all three processes and, based on the matches, generate a ranking of what the next task is most likely to be. This can then be provided to the user/developer. An example of such a result of such a matching is shown below:

```
"name"   : "Sales Account Creation",
"sequence" : [
   {
   "name" : "receive",
   "type" : "receive",
   "application" : "sales",
   "operation" : "createAccount",
   "businessObject"   : "Account"
   },
   {
   "name" : "assign",
   "type" : "assign",
   "mapping" : "Copy sales Account to cloud sales Account"
   },
```

-continued

```
{
    "nextActivities" : {
        "3" : [{
            "name" : "invoke",
            "type" : "invoke ",
            "application" : "cloud sales Cloud",
            "operation" : "createAccount",
            "businessObject"  : "Account"
        },
        {
            "name" : "if",
            "type" : "if",
            "condition" : "$cloudSalesCloud",
            "activity" : {
                    "name" : "invoke",
                    "type" : "invoke",
                    "application" : "cloud Sales Cloud",
                    "operation" : "createAccount",
                    "businessObject"  : "Account"
            }
            else: {
                "activity" : {
                    "name" : "invoke",
                    "type" : "invoke",
                    "application" : "S sales Cloud",
                    "operation" : "createAccount",
                        "businessObject"  : "Account"
                }
            }
        }
        ]
        "4" : { }
    }
}
```

In accordance with an embodiment, the systems and methods rank the potential next tasks in order of most likely to less likely: "invoke" task followed by "if" as it has higher frequency of occurrence at index 3 of a sequence activity.

In accordance with an embodiment, based upon on the pattern recognition, the method can generate a mechanism where the "next step" can be predicted, in addition to the prediction of the entire flow. This is then based upon the models that are already matched. Use a statistical method to determine which "next step" is used most in the matched flows from the first prediction. For example, if a user enters a "Router" task, then at the highest index (index 0), the most highest probability for the next step is most likely "Transformer" with a target of rest, and then the next likely is "rest" invoke, and then the next most likely is transform rest. Then the system can go to index 1—which is then the next step. At each index, or sequence number, generate the probability of which activity is most likely.

Figure 11:
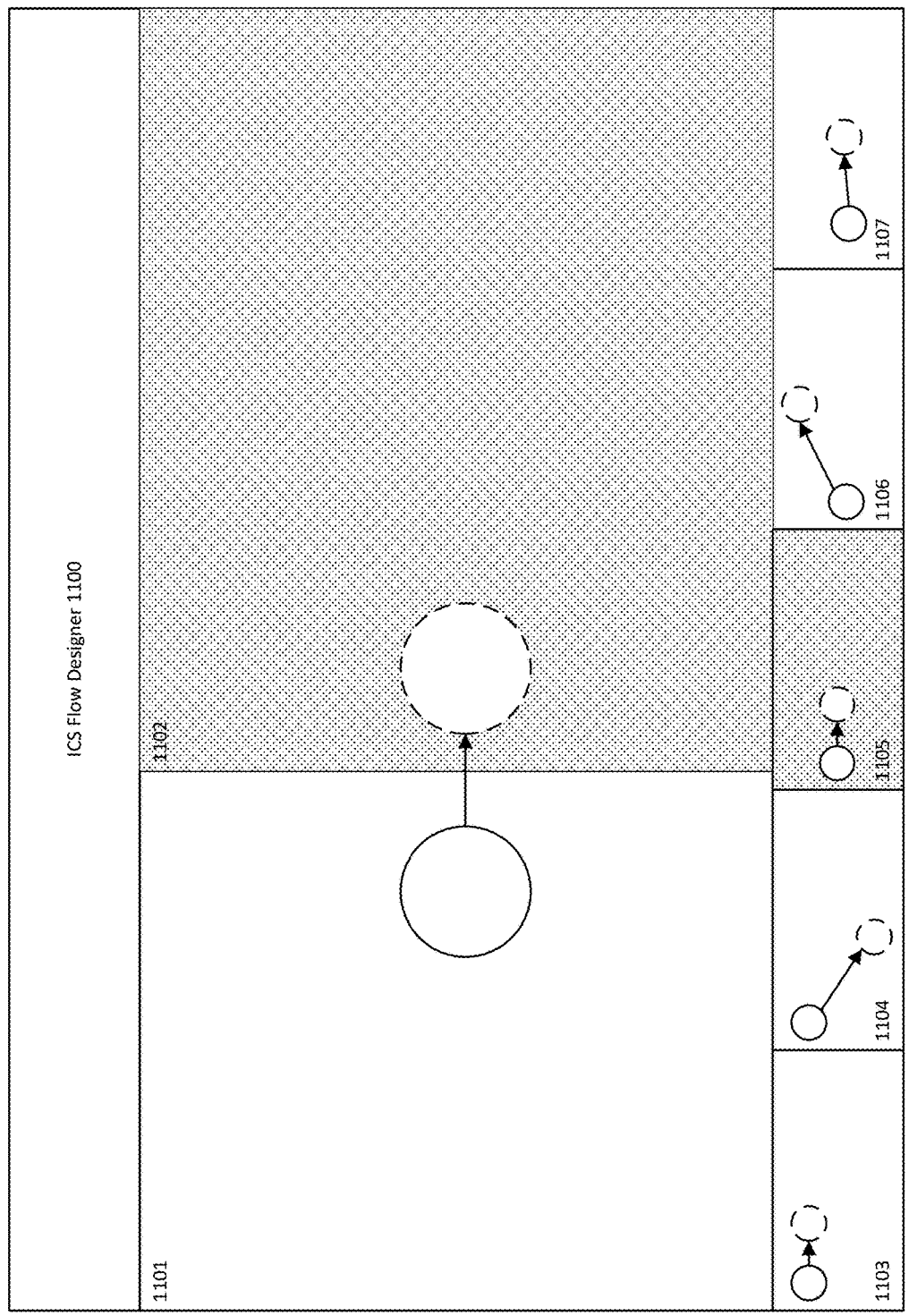
FIG. 11 illustrates an exemplary flow chart decision tree, in accordance with an embodiment.

FIG. 11 illustrates an exemplary flow chart decision tree, in accordance with an embodiment.

In accordance with an embodiment, a user may select a first portion of an integrated flow, which is shown in the unshaded portion 1101 of the flow designer 1100. From this beginning of an integrated flow, depending upon the context of the user, the systems and methods can present a number of next task options 1103-1107 to the user to be variously selected. As shown in the figure, the predicted next task option 1105 is currently being displayed in window 1102 (current selection window). Additional next task recommendations can be provided as a card layout which can be selected. On selection of a particular recommend/predicted next task, the ICS designer can display an additional predicted next task (at the following index).

In accordance with an embodiment, although only shown as two sequential indexes of a flow, it is to be readily understood that the systems and methods described herein can display more than one next index level of predicted tasks, and that the next task predictions can be based upon more than a single task index.

In accordance with an embodiment, the recommended next task may not being selected for the flow (e.g., where the recommendation is not a correct recommendation). In this scenario, other next task recommendations can be consistently presented as predictions within a "prediction plane" depicted as in the flow in the shaded regions in the figure. This then provides an option of selecting individual tasks or the entire flow. The systems and methods can also present a card layout that can be flicked for all the possible recommendations to complete the flow. This allows for navigation to see how each predicted ICS flow looks like and how it behaves. The flows can be tested in real time as each option is selected. The testing can provide functional and performance profiles before a final selection of the flow.

Figure 12:
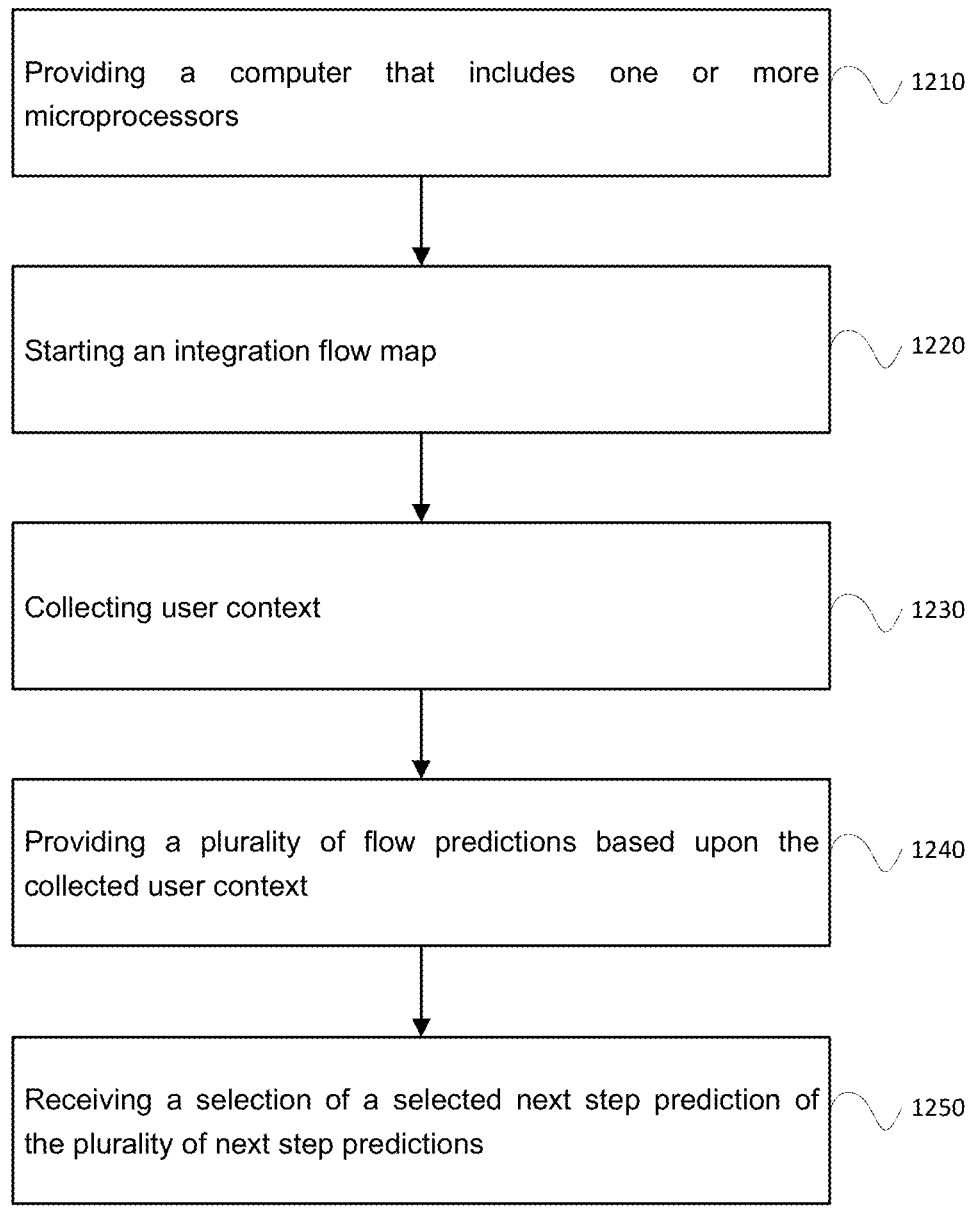
FIG. 12 shows a flowchart of an exemplary method for next step prediction for ICS (integration cloud services) flow using artificial intelligence/machine learning.

FIG. 12 shows a flowchart of an exemplary method for next step prediction for ICS (integration cloud services) flow using artificial intelligence/machine learning.

At step 1210, the method can provide a computer that includes one or more microprocessors.

At step 1220, the method can start an integration flow map.

At step 1230, the method can collect user context.

At step 1240, the method can provide a plurality of next step predictions within the integration flow map based on the collected user context.

At step 1250, the method can receive a selection of a selected next step prediction of the plurality of next step predictions.

Predicting Activity's Application, Operation, and Business Object Based on Pattern Recognition In accordance with an embodiment, the systems and methods described herein can provide a mechanism for ranking of applications, operations and business objects referred by an activity based on pattern recognition (e.g., JSON pattern recognition). Ranking of applications, operations and business objects referred by activity can be calculated in multiple contexts. For example, these contexts ca be based on exact/partial context (i.e., rankings are calculated based on all previous tasks). In accordance with an embodiment, the predictions can be additionally, or alternatively, be based on generic context that takes into account frequency of applications, operations and business objects referred by a particular task.

In accordance with an embodiment, after patterns are recognized (e.g., ICS JSON patterns) based on the input model (model of the process being designed), a ranking engine can calculate the model rankings based on exact/partial match. This can be done, for example, based on all preceding tasks match. In accordance with an embodiment, the system can also calculates model rankings purely based on the enclosing scope (i.e., what is the most probable application, operation and business object for a particular task).

In accordance with an embodiment, a flow pattern (e.g., ICS JSON flow) recognition results in a subset of models that most closely match the designed flow (input). Based on this subset of matched ICS models, the ranking of application, operation and business objects are determined.

Perfect/Partial Match

In accordance with an embodiment, the systems and methods can rank application, operation and business object referred by a particular task based on their frequency of occurrence based on pattern recognition of existing flow (e.g., JSON pattern of ICS flows). To illustrate this, take for example the below "Sales Account Creation" ICS flow. In such example, supposed a user is in midst of designing this ICS flow and has reached an assign step mapping a sales account business object to a sales cloud account business object. Based on this input, a pattern recognition system recognizes a number of existing flows that closely match this input pattern (ICS flow being designed). The exemplary input flow is provided below:

```
{
    "name"    : "Sales Account Creation",
    "sequence" : [
      {
        "name" : "receive",
        "type" : "receive",
        "application" : "sales",
        "operation" : "createAccount",
        "businessObject"    : "Account"
      },
      {
        "name" : "assign",
        "type" : "assign",
        "mapping" : "Copy sales account to cloud sales account"
      }
    ]
}
```

In accordance with an embodiment, and for simplifying this example, suppose 3 existing flows are matched to this input flow from the existing database. These three matched flows are provided below:

Model 1:

```
{
"name"    : "Sales Account Creation - Company A, Department A",
"sequence" : [
  {
    "name" : "receive",
    "type" : "receive",
    "application" : "sales",
    "operation" : "createAccount",
    "businessObject"    : "Account"
  },
  {
    "name" : "assign",
    "type" : "assign",
    "mapping" : "Copy sales account to cloud sales account"
  },
  {
    "name" : "invoke",
    "type" : "invoke ",
    "application" : "cloud sales cloud",
    "operation" : "createAccount",
    "businessObject"    : "Account"
  }
 ]
}
```

Model 2:

```
{
"name"    : "Sales Account Creation - Company B, Department B",
"sequence" : [
  {
    "name" : "receive",
    "type" : "receive",
    "application" : "sales",
    "operation" : "createAccount",
    "businessObject"    : "Account"
  },
```

Model 2:

```
  {
  "name" : "assign",
  "type" : "assign",
  "mapping" : "Copy sales account to cloud sales account"
  },
  {
  "name" : "invoke",
  "type" : "invoke ",
  "application" : "cloud sales Cloud",
  "operation" : "createAccount",
  "businessObject"    : "Account"
  }
 ]
}
```

Model 3:

```
{
  "name"    : "Sales Account Creation - Company C, Department C",
  "sequence" : [
    {
     "name" : "receive",
     "type" : "receive",
     "application" : "sales",
     "operation" : "createAccount",
     "businessObject"    : "Account"
    },
    {
     "name" : "assign",
     "type" : "assign",
     "mapping" : "Copy sales account to cloud sales account"
    },
    {
     "name" : "invoke",
     "type" : "invoke",
     "application" : "someother cloud sales Cloud",
     "operation" : "createAccount",
     "businessObject"    : "Account"
    }
  ]
}
```

In accordance with an embodiment, a pattern recognition system and method (e.g., JSON pattern recognition system and method) can match all three models above, and based on the matches, calculates rankings of application, operation and business objects:

```
  {
   "name"    : "Sales Account Creation",
   "sequence" : [
     {
      "name" : "receive",
      "type" : "receive",
      "application" : "sales",
      "operation" : "createAccount",
      "businessObject" : "Account"
     },
     {
      "name" : "assign",
      "type" : "assign",
      "mapping" : "Copy sales account to could sales account"
     },
     {
      "name" : "invoke",
      "type" : "invoke",
      "rankings" : {
        "application" : [
          { //Higher Ranking => Higher Frequency
            "name" : "cloud sales cloud",
            "operation" : [
```

-continued

```
            {
                "name" : "createAccount",
                "businessObject" : [
                    {
                        "name" : "Account"
                    }
                ]
            }
        ]
    },
    {
        "name" : "someother cloud sales Cloud",
            "operation" : [
            {
                "name" : "createAccount",
                "businessObject"   : [
                    {
                        "name" : "Account"
                    }
                ]
            }
        ]
    }
    ]
}
```

In accordance with an embodiment, the ranking systems ranks "cloud sales cloud" application higher than "some other cloud sales Cloud" application for an invoke task. In this way, if a user creates a new "invoke" task, system can present the user a choice to select "cloud sales cloud" as a primary/preferred/first option. It does so because it is more likely as the system is triggered by a create account event from sales. That is, the training data contains more flows that start with "sales" receive followed by assign and finally an invocation to "cloud sales cloud".

In accordance with an embodiment, the systems and methods can rank applications, operations, and business objects referred by a particular task based independent of location. For example, take an "HR Account Creation" ICS flow supplied below. Here, a user is in midst of designing this ICS flow and has reached an assign step mapping a "workable HR account" business object to cloud HR cloud account business object. Based on this input, the pattern recognition system recognizes, for example, a number of existing flows in a training database that closely match this input pattern (ICS flow being designed). The example input flow is here:

```
{
    "name" : "HR Account Creation",
    "sequence" : [
    {
    "name" : "receive",
    "type" : "receive",
    "application" : "workable",
    "operation" : "createAccount",
    "businessObject" : "Account"
    },
    {
    "name" : "assign",
    "type" : "assign",
    "mapping" : "Copy workable account to cloud HR account"
    }
    ]
}
```

In accordance with an embodiment, the systems and methods can match the input flow to a number of similar existing flows in the training database, despite the existing flows not having a "workable HR account" business object. In such a case there is no exact match for a process that starts with workable create account as the system has not seen this before it makes a generalized prediction that if third task is a invoke, based on systems generalized prediction the user might what to create a sales account; that is what other users usually do when they use invoke activity. This can be understood from the matched flow, here:

```
{
    "rankings" : {
        "invoke" : {
            "application" : [
                { //Higher Ranking => Higher Frequency
                "name" : "cloud Sales Cloud",
                "operation" : [
                {
                    "name" : "createAccount",
                    "businessObject" : [
                    {
                        "name" : "Account"
                    }
                    ]
                }
                ]
            },
            {
            "name" : "$ Sales Cloud",
                "operation" : [
                {
                    "name" : "createAccount",
                    "businessObject"   : [
                    {
                        "name" : "Account"
                    }
                    ]
                }
                ]
            }
            ]
        },
"name"   : "HR Account Creation",
"sequence" : [
    {
    "name" : "receive",
    "type" : "receive",
    "application" : "workable",
    "operation" : "createAccount",
    "businessObject"   : "Account"
    },
    {
    "name" : "assign",
    "type" : "assign",
    "mapping" : "Copy Workday Account to Oracle HR Account"
    },
    {
    "name" : "invoke",
    "type" : "invoke"
    }
    ]
}
```

Figure 13:
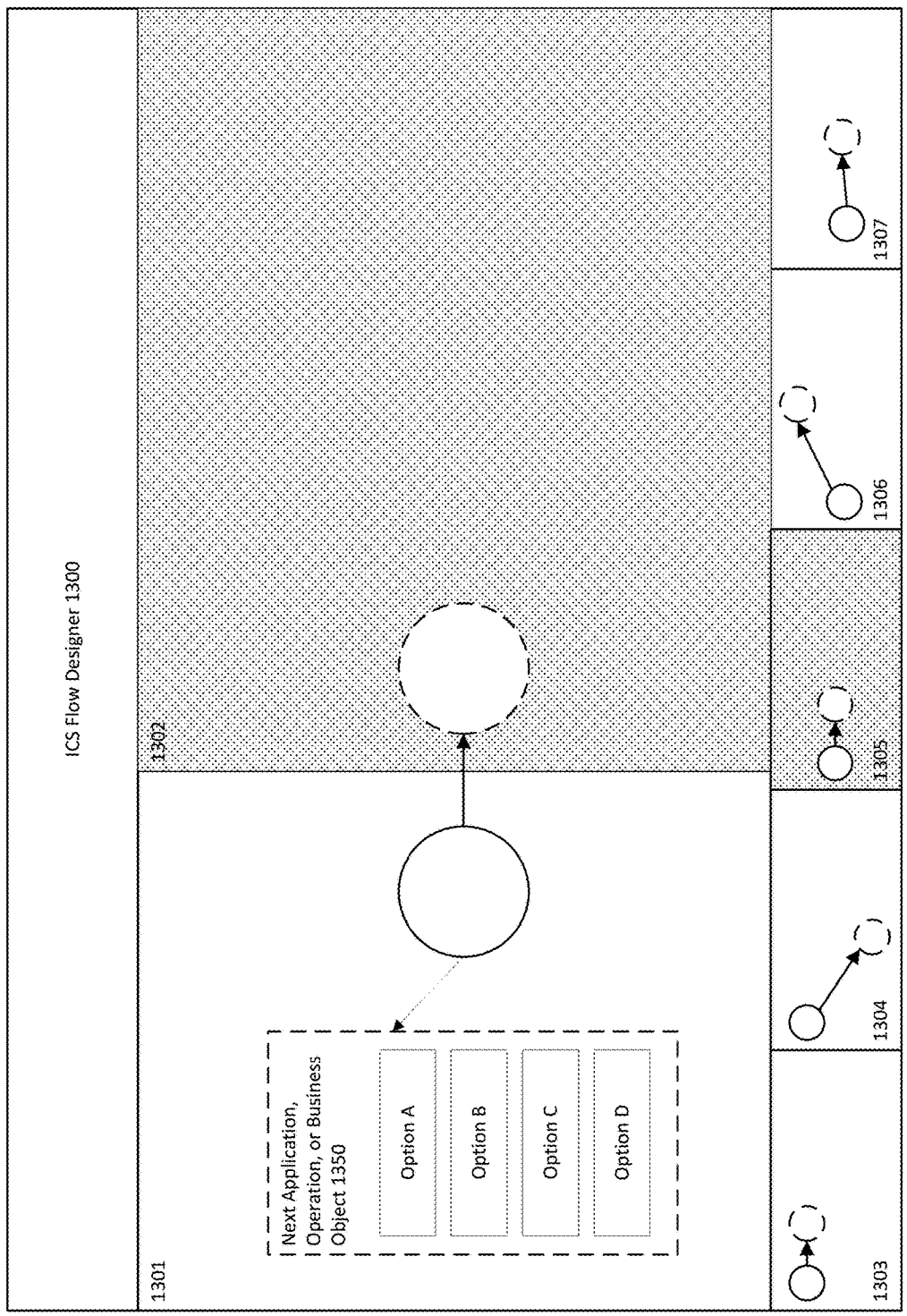
FIG. 13 illustrates an exemplary flow chart decision tree, in accordance with an embodiment.

FIG. 13 illustrates an exemplary flow chart decision tree, in accordance with an embodiment.

In accordance with an embodiment, a user may select a first action of an integrated flow, which is shown in the unshaded portion 1301 of the flow designer 1300. From this beginning of an integrated flow, the systems and methods can predict a number of flows that are already stored in a training database. For example, predicted next actions can be presented in various windows, such as 1302-1307. However, upon selection or indication by the user of a request for a next application, operation, or business object, the system can present, within a window 1350 for example, a number of options to the user, such as options A-D. These options can comprise, for example, predicted next applications, operations, or business objects. The user can then, if desired, select one of the presented options, where the presented options can be shown in an order from most likely to less likely, based upon the matches between the input flow and the stored completed flows.

Figure 14:
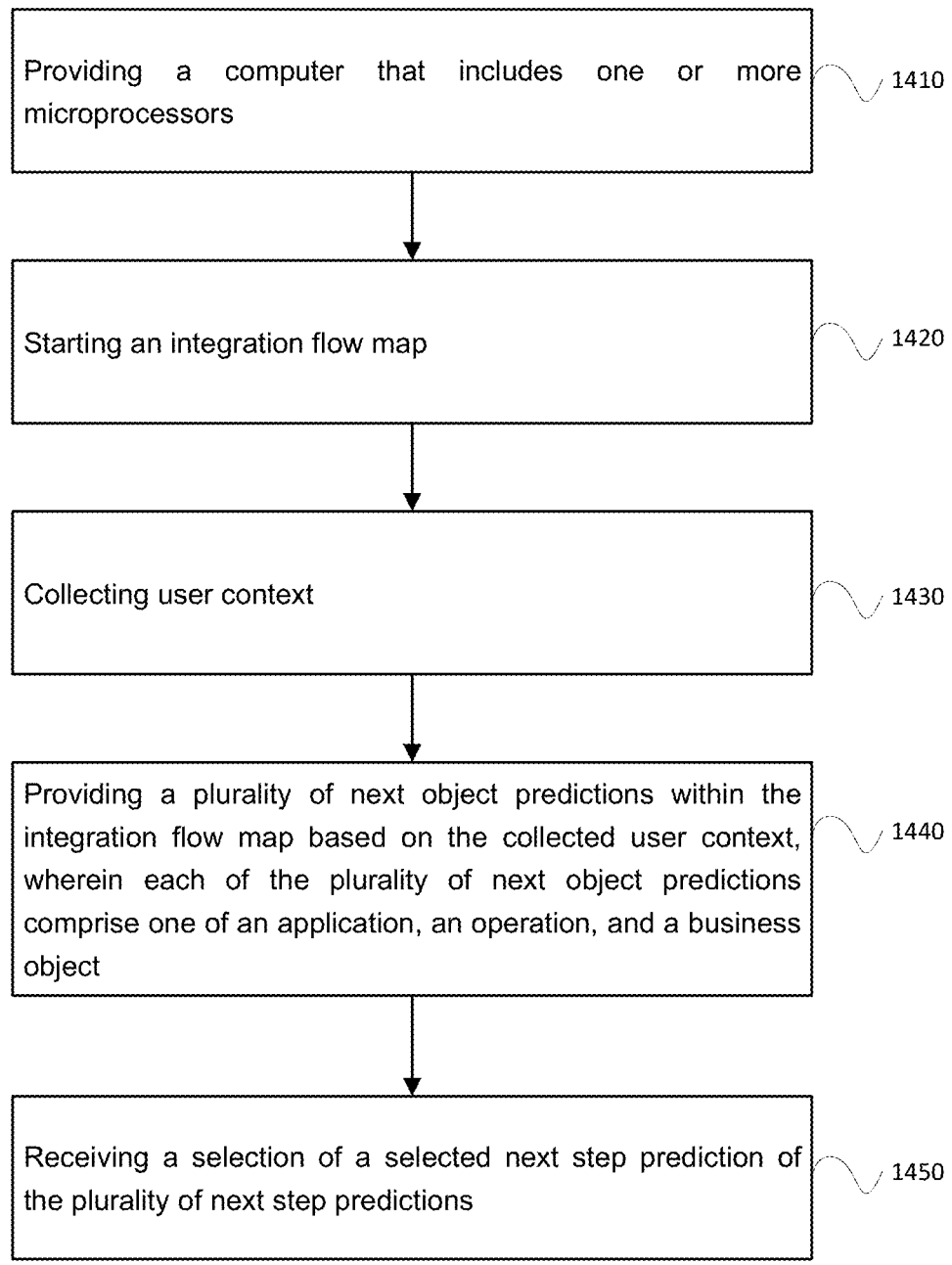
FIG. 14 shows a flowchart of an exemplary method for next object prediction for ICS (integration cloud services) flow using artificial intelligence/machine learning.

FIG. 14 shows a flowchart of an exemplary method for next object prediction for ICS (integration cloud services) flow using artificial intelligence/machine learning.

At step 1410, the method can provide a computer that includes one or more microprocessors.

At step 1420, the method can start an integration flow map.

At step 1430, the method can collect user context.

At step 1440, the method can provide a plurality of next object predictions within the integration flow map based on the collected user context, wherein each of the plurality of next object predictions comprise one of an application, an operation, and a business object.

At step 1450, the method can receive a selection of a selected next object prediction of the plurality of next step predictions.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for next step prediction for ICS (integration cloud services) flow using artificial intelligence/machine learning, comprising:
a computer including one or more microprocessors;
an integration platform running on the computer, the integration platform comprising an integration flow designer, the integration flow designer having access to a library comprising a plurality of objects, each object comprising one of an application, an operation, and a business object, each object being selectable to be utilized within an integration flow designed within the integration flow designer;
wherein the computer performs steps comprising:
start a design template for an integration flow within the integration flow designer;
collect user context and process context related to the integration flow;
based on the collected user context, process context, and a selected step of the integration flow, select and concurrently provide, as selectable options displayed via a graphical user interface, a plurality of next step predictions from the plurality of objects, each of the plurality of next step predictions capable of being used within the integration flow, wherein at least one of the provided plurality of next step predictions comprises a predicted next task at a first index level, the first index level corresponding to an immediate next task from the selected step, and wherein at least another of the provided next step predictions comprises another predicted task at a second index level, the second index level being higher than the first index level, the second index level corresponding to a next task following the predicted next task in the integration flow, said selection of the plurality of next step predictions being based on a query, by the computer, to a tree structure comprising a hierarchical clustering model of pattern recognition process models, said query comprising both the user context and the process context;
receive a selection of a selected next step prediction of the plurality of next step predictions;
automatically populate, by an auto-completion engine, the selected next step prediction into the integration flow within the integration flow designer; and
upon the automatic population of the selected next step prediction into the integration flow, and based upon the selected next step prediction and the user context and the process context, automatically update the selectable options displayed via the graphical user interface to comprise a new set of next step predictions capable of being used within the integration flow.

2. The system of claim 1, wherein the user context and process context take into account organization, subsidiary, department, sub-departments, and user information.

3. The system of claim 2, wherein the hierarchical clustering model of pattern recognition process models is utilized in providing the plurality of next step predictions.

4. The system of claim 3, wherein the hierarchical clustering model of pattern recognition of process models utilizes stored machine learning knowledge of process design as a hierarchy of clusters.

5. The system of claim 4, wherein the hierarchical clustering model of pattern recognition of process models further utilizes machine learning models based on the collected user context.

6. The system of claim 1, wherein a ranking generator is used in providing the plurality of next step predictions.

7. The system of claim 6, wherein the ranking generator utilizes an input pattern to rank a plurality of output patterns matched with the input pattern, the ranking utilizing one or more inputs; and
wherein the input pattern is created in part from the collected user context.

8. A method for next step prediction for ICS (integration cloud services) flow using artificial intelligence/machine learning, comprising:
providing a computer that includes one or more microprocessors;
providing an integration platform running on the computer, the integration platform comprising an integration flow designer, the integration flow designer having access to a library comprising a plurality of objects, each object comprising one of an application, an operation, and a business object, each object being selectable to be utilized within an integration flow designed within the integration flow designer;
starting a design template for an integration flow within the integration flow designer;
collecting user context and process context related to the integration flow;
based upon the collected user context, process context, and a selected step of the integration flow, selecting and concurrently providing, as selectable options displayed via a graphical user interface, a plurality of next step predictions from the plurality of objects, each of the plurality of next step predictions capable of being used within the integration flow, wherein at least one of the provided plurality of next step predictions comprises a predicted next task at a first index level, the first index level corresponding to an immediate next task from the selected step, and wherein at least another of the provided next step predictions comprises another predicted task at a second index level, the second index level being higher than the first index level, the second index level corresponding to a next task following the predicted next task in the integration flow, said selection of the plurality of next step predictions being based on a query, by the computer, to a tree structure comprising a hierarchical clustering model of pattern recognition process models, said query comprising both the user context and the process context;
receiving a selection of a selected next step prediction of the plurality of next step predictions;
automatically populating, by an auto-completion engine, the selected next step prediction into the integration flow within the integration flow designer; and
upon the automatic population of the selected next step prediction into the integration flow, and based upon the selected next step prediction and the user context and the process context, automatically updating the selectable options displayed via the graphical user interface to comprise a new set of next step predictions capable of being used within the integration flow.

9. The method of claim 8, wherein the user context and process context take into account organization, subsidiary, department, sub-departments, and user information.

10. The method of claim 9, wherein the hierarchical clustering model of pattern recognition process models is utilized in providing the plurality of next step predictions.

11. The method of claim 10, wherein the hierarchical clustering model of pattern recognition process models utilizes stored machine learning knowledge of process design as a hierarchy of clusters.

12. The method of claim 11, wherein the hierarchical clustering model of pattern recognition process models further utilizes machine learning models based on the collected user context.

13. The method of claim 8, wherein a ranking generator is used in providing the plurality of next step predictions.

14. The method of claim 13, wherein the ranking generator utilizes an input pattern to rank a plurality of output patterns matched with the input pattern, the ranking utilizing one or more inputs; and wherein the input pattern is created in part from the collected user context.

15. A non-transitory computer readable storage medium, having instructions for next step prediction for ICS (integration cloud services) flow using artificial intelligence/machine learning, which when read and executed by one or more computers cause the one or more computers to perform providing a computer that includes one or more microprocessors;

providing an integration platform running on the computer, the integration platform comprising an integration flow designer, the integration flow designer having access to a library comprising a plurality of objects, each object comprising one of an application, an operation, and a business object, each object being selectable to be utilized within an integration flow designed within the integration flow designer;

starting a design template for an integration flow within the integration flow designer;

collecting user context and process context related to the integration flow;

based upon the collected user context, process context, and a selected step of the integration flow, selecting and concurrently providing, as selectable options displayed via a graphical user interface, a plurality of next step predictions from the plurality of objects, each of the plurality of next step predictions capable of being used within the integration flow, wherein at least one of the provided plurality of next step predictions comprises a predicted next task at a first index level, the first index level corresponding to an immediate next task from the selected step, and wherein at least another of the provided next step predictions comprises another predicted task at a second index level, the second index level being higher than the first index level, the second index level corresponding to a next task following the predicted next task in the integration flow, said selection of the plurality of next step predictions being based on a query, by the computer, to a tree structure comprising a hierarchical clustering model of pattern recognition process models, said query comprising both the user context and the process context;

receiving a selection of a selected next step prediction of the plurality of next step predictions;

automatically populating, by an auto-completion engine, the selected next step prediction into the integration flow within the integration flow designer; and upon the automatic population of the selected next step prediction into the integration flow, and based upon the selected next step prediction and the user context and the process context, automatically updating the selectable options displayed via the graphical user interface to comprise a new set of next step predictions capable of being used within the integration flow.

16. The non-transitory computer readable storage medium of claim 15, wherein the user context and process context take into account organization, subsidiary, department, sub-departments, and user information.

17. The non-transitory computer readable storage medium of claim 16, wherein the hierarchical clustering model of pattern recognition process models is utilized in providing the plurality of next step predictions.

18. The non-transitory computer readable storage medium of claim 17, wherein the hierarchical clustering model of pattern recognition process models utilizes stored machine learning knowledge of process design as a hierarchy of clusters.

19. The non-transitory computer readable storage medium of claim 18, wherein the hierarchical clustering model of pattern recognition process models further utilizes machine learning models based on the collected user context.

20. The non-transitory computer readable storage medium of claim 15, wherein a ranking generator is used in providing the plurality of next step predictions;

wherein the ranking generator utilizes an input pattern to rank a plurality of output patterns matched with the input pattern, the ranking utilizing one or more inputs; and wherein the input pattern is created in part from the collected user context.

\* \* \* \* \*